United States Patent
Guay et al.

(10) Patent No.: US 11,358,797 B1
(45) Date of Patent: Jun. 14, 2022

(54) CONVEYOR IDLER AND SUPPORT STRUCTURE AND METHODS FOR CONSTRUCTING THE SAME

(71) Applicant: NHI Mechanical Motion, LLC, Claremont, NH (US)

(72) Inventors: Kevin J. Guay, West Lebanon, NH (US); Alexander J. Moskalenko, Springfield, NH (US); Zachary P. Kerin, White River Junction, VT (US)

(73) Assignee: NHI Mechanical Motion, LLC, Claremont, NH (US)

( * ) Notice: Subject to any disclaimer, the term of this patent is extended or adjusted under 35 U.S.C. 154(b) by 0 days.

(21) Appl. No.: 17/174,579

(22) Filed: Feb. 12, 2021

Related U.S. Application Data

(62) Division of application No. 16/773,875, filed on Jan. 27, 2020, now Pat. No. 10,981,727.

(51) Int. Cl.
| | |
|---|---|
| *B65G 15/60* | (2006.01) |
| *B65G 39/09* | (2006.01) |
| *B21D 43/00* | (2006.01) |
| *B65G 21/02* | (2006.01) |
| *B65G 39/12* | (2006.01) |

(Continued)

(52) U.S. Cl.
CPC .............. *B65G 15/60* (2013.01); *B21D 43/00* (2013.01); *B65G 21/02* (2013.01); *B65G 39/09* (2013.01); *B65G 39/12* (2013.01); *B22F 5/003* (2013.01); *F16C 33/805* (2013.01)

(58) Field of Classification Search
CPC ........ B65G 39/09; B65G 39/10; B65G 39/12; B65G 21/02; B65G 21/06
See application file for complete search history.

(56) References Cited

U.S. PATENT DOCUMENTS

| | | |
|---|---|---|
| 1,793,346 A | 2/1931 | Wego |
| 3,252,556 A | 5/1966 | Isacsson |
| 3,406,438 A | 10/1968 | Reilly |

(Continued)

FOREIGN PATENT DOCUMENTS

| | | |
|---|---|---|
| CN | 102976055 A | 3/2013 |
| CN | 105460544 A | 4/2016 |

(Continued)

*Primary Examiner* — William R Harp
(74) *Attorney, Agent, or Firm* — Loginov & Associates, PLLC; William A. Loginov

(57) ABSTRACT

This invention provides an idler for use in conveyor systems and associated shaft and support structure that reduces the potential for infiltration of contaminants into the bearing assemblies at the opposing ends of the shaft. By use of stampings, co-molded polymer with sealed metal end caps, press-fit end shafts and stamped-metal support structures a more contamination-resistant and efficiently constructed idler assembly is provided. A hollow shaft center section can be used. The polymer defines at least three sealing structures. The shaft defines a multi-piece unit, with the end shafts press-fit onto the center shaft section and held in place by the bearing subassemblies—affixed to the idler sleeve. The support framework includes three stamped and/or cut, and folded sheet metal pieces—a center section with a pair of opposing central risers that engage end shafts, and two opposing, separately attached, end risers, that engage outermost idler end shafts.

16 Claims, 16 Drawing Sheets

(51) Int. Cl.
*B22F 5/00* (2006.01)
*F16C 33/80* (2006.01)

(56) References Cited

U.S. PATENT DOCUMENTS

| | | | |
|---|---|---|---|
| 4,277,114 A | | 7/1981 | Lindegger |
| 4,919,253 A | | 4/1990 | Morrison |
| 5,022,132 A | | 6/1991 | Valster |
| 5,028,054 A | | 7/1991 | Peach |
| 5,044,490 A | * | 9/1991 | East ............... B65G 39/12 198/830 |
| 5,197,592 A | | 3/1993 | East |
| 5,373,935 A | * | 12/1994 | Anderson ......... B65G 39/12 198/808 |
| 5,383,549 A | | 1/1995 | Mayer |
| D401,717 S | | 11/1998 | Grueber |
| 5,954,186 A | | 9/1999 | Stroobandt |
| D423,178 S | | 4/2000 | Specht |
| 6,082,528 A | | 7/2000 | Habberley |
| 6,349,819 B1 | * | 2/2002 | Nohl ............... B65G 39/12 198/830 |
| 6,547,054 B2 | | 4/2003 | Gamache |
| 6,634,490 B2 | | 10/2003 | Fischer |
| 6,641,512 B2 | | 11/2003 | Bryant, Jr. |
| 7,028,825 B2 | | 4/2006 | Scott |
| 8,146,733 B2 | | 4/2012 | Fox |
| 9,056,727 B2 | | 6/2015 | White |
| 9,133,940 B1 | | 9/2015 | Taylor |
| D750,864 S | | 3/2016 | Roessler |
| 9,359,144 B2 | | 6/2016 | White |
| D772,517 S | | 11/2016 | Schiltz |
| 10,088,053 B1 | | 10/2018 | Hartney |
| D880,097 S | | 3/2020 | Wolf |
| D880,098 S | | 3/2020 | Harrison |
| 10,981,727 B1 | * | 4/2021 | Guay ............... B65G 15/60 |
| D924,529 S | | 7/2021 | Simmendinger |
| D924,530 S | | 7/2021 | Simmendinger |
| D924,531 S | | 7/2021 | Simmendinger |
| D932,129 S | | 9/2021 | Wolf |
| 2003/0015394 A1 | | 1/2003 | Nimmo |
| 2004/0079621 A1 | | 4/2004 | Mott |
| 2014/0202823 A1 | | 7/2014 | White |

FOREIGN PATENT DOCUMENTS

| | | |
|---|---|---|
| EP | 112026 A | 6/1984 |
| WO | 2018067574 A1 | 4/2018 |

\* cited by examiner

CONVEYOR IDLER AND SUPPORT STRUCTURE AND METHODS FOR CONSTRUCTING THE SAME

RELATED APPLICATIONS

This application is a divisional of co-pending U.S. patent application Ser. No. 16/773,875, filed Jan. 27, 2020, entitled CONVEYOR IDLER AND SUPPORT STRUCTURE AND METHODS FOR CONSTRUCTING THE SAME, the entire disclosure of which is herein incorporated by reference.

FIELD OF THE INVENTION

This invention relates to idlers and supporting structures used to rotatably support industrial conveyor belts.

BACKGROUND OF THE INVENTION

Conveyor systems that utilize belts are used in a wide range of industries and applications. Their length and width vary significantly, depending upon the needs of the jobsite. Conveyor systems can be either fixed in place or mobile. In general, the belt consists of a continuous, durable and flexible material—such as steel-reinforced or fiber-reinforced polymer (e.g. natural or synthetic rubber). The belt can be adapted to move tons of loose material over a given timeframe. To ensure that the belt remains generally planar along its moving surface, a series of (relatively) closely spaced idlers are provided between one or more drive pulleys. Such drive pulleys can be located at the end(s) of the belt, or another appropriate location along its length.

In certain applications—such as movement of coal, gravel ore, and other loose material, the conveyor belt is formed into a trough shape along its transverse cross section. The raised sides of the trough retain the material in place as it transits the length of the belt. This trough shape is maintained, in part by the arrangement of the underlying idlers. For example, a set of three idlers are employed, each of a similar axial length. The three idlers consist of a center idler that has a rotational axis parallel to the ground, and the two opposing side idlers, having rotational axes that are angled upwardly, in each of opposing directions to define an isosceles trapezoid.

The idlers are mounted in a support frame that secures fixed shafts thereto. The idler sleeves, which contact the belt, are free to rotate relative to the fixed shafts on bearings that are located on each of opposing sides of the sleeve(s). The material carried by the conveyor belt can often include small sand and grit, which is often highly abrasive. The idler ends and bearings are covered and/or sealed to some degree to resist infiltration of this sand and grit into the moving surfaces. However, the seals are not entirely effective, and eventually grit infiltrates the moving elements of the bearings, eventually causing them to fail, and the idler(s) to seize. Such seizure can cause the idler surface to abrade (and potentially destroy) the belt if the seized idler is not replaced promptly. More generally, the need to monitor and replace seized idlers adds to operational costs, and/or causes premature replacement of a damaged, and expensive, conveyor belt.

Additionally, shafts for use in constructing idlers tend to be formed from solid (e.g. steel bar stock) material, and tend to be heavy. This increases construction and shipping costs and can reduce performance under certain circumstances. Likewise, the supporting frameworks for trough-type idler arrangements are typically formed from a plurality of pieces of metal that must be welded and/or attached together accurately to endure proper alignment of the idlers. This requires certain time and costs that it would be desirable to reduce.

It is further desirable to reduce failure of idlers through grit infiltration into bearings and more generally provide more efficient and cost-effective techniques for constructing such idlers. Likewise, techniques that make construction of underlying idler components, such as idler support frames, more efficient and cost effective are also highly desirable.

SUMMARY OF THE INVENTION

This invention overcomes disadvantages of the prior art by providing an idler for use in conveyor systems and associated shaft and support structure that reduces the potential for infiltration of sand, grit and other (typically, abrasive particulates) contaminants into the bearing assemblies at the opposing ends of the shaft. By use of stampings, co-molded polymer with sealed metal end caps, press-fit end shafts and stamped-metal support structures a more contamination-resistant and efficiently constructed idler assembly is provided. The invention also optionally employs a hollow shaft center section to reduce material consumption and weight. The co-molded polymer on each (e.g.) stamped metal end cap defines at least three sealing structures—an external rotating seal that rotates about the respective end shafts, a central labyrinth seal and an internal rotating/contacting seal. These seals operate in combination with an internal idler geometry that radially directs contaminants outwardly (away from the centrally-located bearings) to the internal surface of the idler sleeve, where they remain under centrifugal force during rotation of the idler. The shaft can be constructed as a multi-piece unit, with the end shafts press-fit onto the solid or hollow center shaft section and held in place by the bearing assemblies. The multi-piece construction can be either a three-piece assembly, or a five-piece assembly, with inner races of the bearings pressed onto seats formed on the end shafts. The end shafts can be designed to receive the bearings from outside-in, inside-out, or both directions (in the case of a five-piece shaft, with a pair of two-piece end shaft assemblies). The support framework can be constructed from three stamped and/or cut, and folded sheet metal pieces—a center section with a pair of opposing central risers that engage end shafts of a center and two outer idlers, and two opposing, and separately attached, end risers, that engage outermost end shafts of the two outer idlers. The risers are sized and arranged so that the center idler rotates about a horizontally oriented axis and the two outer idlers rotate about oppositely directed, upwardly (acute) angled axes—thereby defining a trough shape.

In an illustrative embodiment, an idler for a conveyor includes a shaft assembly having a center section and end shafts extending outwardly from each of opposing ends of the idler. A bearing assembly is operatively connected to each of the end shafts respectively. More particularly, the bearing assembly is operatively connected, via a subassembly, to an idler sleeve. End caps are, respectively, affixed to the idler sleeve at each of the opposing ends. The end caps include a co-molded polymer seal that rotatably engages each of the axle ends. Illustratively, the polymer seal defines at least three discrete sealing structures that prevent contaminants from outside the end caps from confronting the bearing assembly. These (at least) three discrete sealing structures define (a) a rotating non-contacting seal between each of the end caps and respective of the end shafts, (b) a rotating labyrinth seal half that confronts a stationary, intermeshed labyrinth seal half, and (c) a stationary contacting seal on the intermeshed labyrinth seal half that confronts a rotating face of the subassembly. The end caps, subassembly and co-molded polymer seal can be constructed and arranged to capture contaminants on an inner surface of the idler sleeve remote from the bearing assembly using centrifugal force. The center section of the shaft assembly can define a hollow or a solid core shaft, and the end shafts are press-fit onto opposing ends of the center section. Each of the end shafts can define either (a) a one-piece unit with a bearing seat onto which the bearing assembly is press-fit from inside-out, (b) a one-piece unit with a bearing seat onto which the bearing assembly is press-fit from outside-in, or (c) a two-piece unit with a bearing seat onto which the bearing assembly is press-fit from each of opposing directions. The subassembly can define a pair of confronting stampings, one of which is affixed to the idler sleeve on an inside surface thereof. These stampings, together, define opposing drawn pockets that receive the bearing assembly therein in a press-fit. Illustratively, the center section is hollow, and includes a sensor operatively connected with a processor that determines at least one of status and performance of the idler.

In another illustrative embodiment, a shaft assembly for supporting an idler is provided. It includes a center section constructed from at least one of a hollow tube and a solid core shaft. The shaft assembly also includes a pair of end shafts, press-fit onto each of opposing ends of the center section. The end shafts include seats for each of bearing assemblies, respectively, in which the bearing assemblies are adapted to rotatably support an idler sleeve. The end shafts each include a surface, outward of the bearing seat, that confronts a seal of an end cap. The end cap can be affixed adjacent to a respective outer end of the sleeve. The bearing assemblies can also be interconnected to subassemblies that extend to, and are affixed to, an inside surface of the sleeve. Illustratively, each of the end shafts define either (a) a one-piece unit with a bearing seat onto which the bearing assembly is press-fit from inside-out, (b) a one-piece unit with a bearing seat onto which the bearing assembly is press-fit from outside-in, or (c) a two-piece unit with a bearing seat, onto which the bearing assembly is press-fit from each of opposing directions. By way of example, (a) can include a flange to stop axial motion of the bearing assembly, located on a side of the bearing assembly that is inward toward the center section, (b) can include a flange to stop axial motion of the bearing assembly, located on a side of the bearing assembly that is outward from the center section, and (c) can include a flange on each of two pieces, engage each side of the bearing assembly. The end shafts can be constructed from a powdered/sintered metal. An outer end of each of the end shafts can include a keyway slot for engaging a riser in a support frame. At least one of the end shafts can define a distally extended keyway, with at least one flat and the riser includes a receiving slot that fully surrounds and conforms to a shape of a cross section of the keyway when the keyway is inserted axially into the receiving slot.

In another illustrative embodiment, a framework for a plurality of idlers, mounted on central and end risers, that rotatably support a conveyor belt is provided. A center section is formed from stamped sheet metal, which defines a non-planar cross section with opposing ends. The central risers are folded from a top surface of the center section as unitary members. A pair of end risers are mounted at each of the opposing ends. The end risers are formed from sheet metal, and affixed to the ends by metal attachment processes. Illustratively, the end risers each comprise a base section and a riser section with a fold line therebetween. The central risers can define folded ends, adapted to receive end shafts of idler on each of opposing sides thereof. The central risers and the end risers can define folds that orient a center idler along a horizontal rotation axis; and that orient each of a pair of idlers on opposing sides of the center idler at opposing upward-acute-angled rotation axes with respect to the horizontal rotation axis so as to define a trough shape.

A method of manufacture of a framework for supporting an idler assembly, according to various embodiments herein, is provided. This method includes the step of forming a center section sheet metal blank that includes edges with tabs for receiving the end risers and cutouts for the central risers. The center section sheet metal blank is then stamped into a non-planar shape with the top surface and sides. The central risers are then folded up, and offsets and folds are defined in the central risers to receive the end shafts. An end riser sheet metal blank is formed (cut or stamped) for each of a pair of end risers, including at least one slot for receiving one of the tabs. Each end riser sheet metal blank is then folded to define the base section and the riser section in a transverse orientation relative to each other. Each of the riser sections on the end risers is folded to respectively define the acute angle. Each end riser is then applied and affixed to each of the opposing ends of the center section. Illustratively, the method further includes the step of attaching keyway slots in the end shafts of each of the idlers to a respective slot formed in an end of each of the end risers and the central risers

BRIEF DESCRIPTION OF THE DRAWINGS

The invention description below refers to the accompanying drawings, of which.

DETAILED DESCRIPTION

I. Assembly Overview

Figure 1:
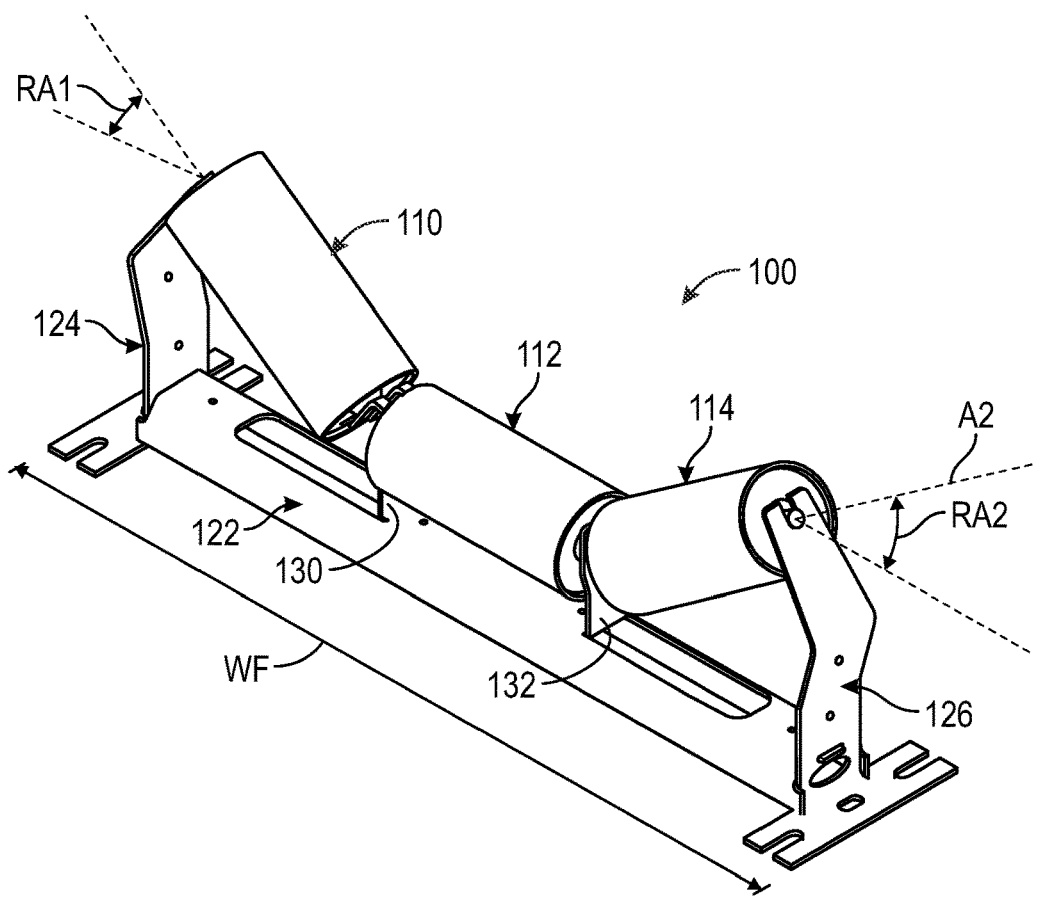
FIG. 1 is a perspective view of a trough-shaped idler assembly, including a stamped frame assembly and three idlers according to an exemplary embodiment.
Figure 2:
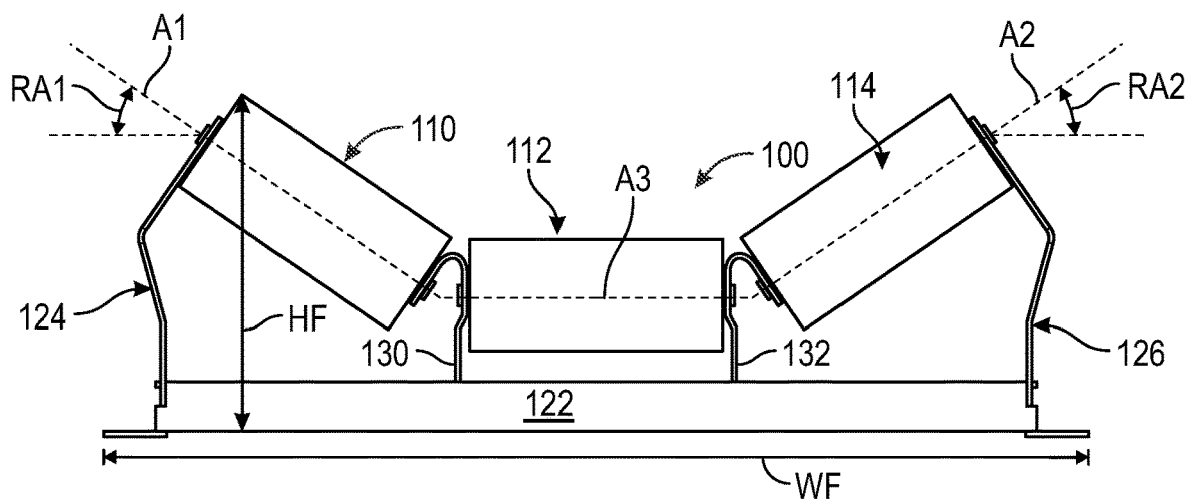
FIG. 2 is a front view of the idler trough assembly of FIG. 1.

FIGS. 1 and 2 show an idler trough assembly 100 for supporting a trough-shaped conveyor belt (not shown) according to an exemplary embodiment. The assembly 100 consists of a set of (e.g.) three discrete idler assemblies 110, 112 and 114 that define a center (idler 112) and opposing, upwardly angled sides (idlers 110 and 114). The center idler 112 rotates about a horizontally-directed axis A3, while each of the opposing idlers 110 and 114 rotate about respective axes A1 and A2, which are oriented at opposing, acute angles RA1 and RA2, with respect to the horizontal direction (parallel with center rotation axis A3). The angles RA1 and RA2 are variable depending upon the overall width WF and height HF of the assembly 100, as well as the belt size being used, and other job-specific factors—such as the size of material pieces being conveyed, their weight, etc. In an embodiment, the angles RA1 and RA2 are approximately 20-60 degrees.

The idlers 110, 112 and 114 are supported axially and laterally by a frame assembly 120, consisting of a center section 122 and a pair of opposing end risers 124 and 126. As described further below, the frame assembly 120 is advantageously formed from pieces of stamp-cut/bent/formed sheet metal (e.g. low-carbon steel sheet) of appropriate gauge/thickness. The frame assembly center section 122 includes a pair of formed/bent risers 130 and 132 that respectively support end shafts of idlers 110, 112 and 114. The outer risers 124 and 126, likewise, support outermost opposing ends of the idlers 110 and 114.

Figure 3:
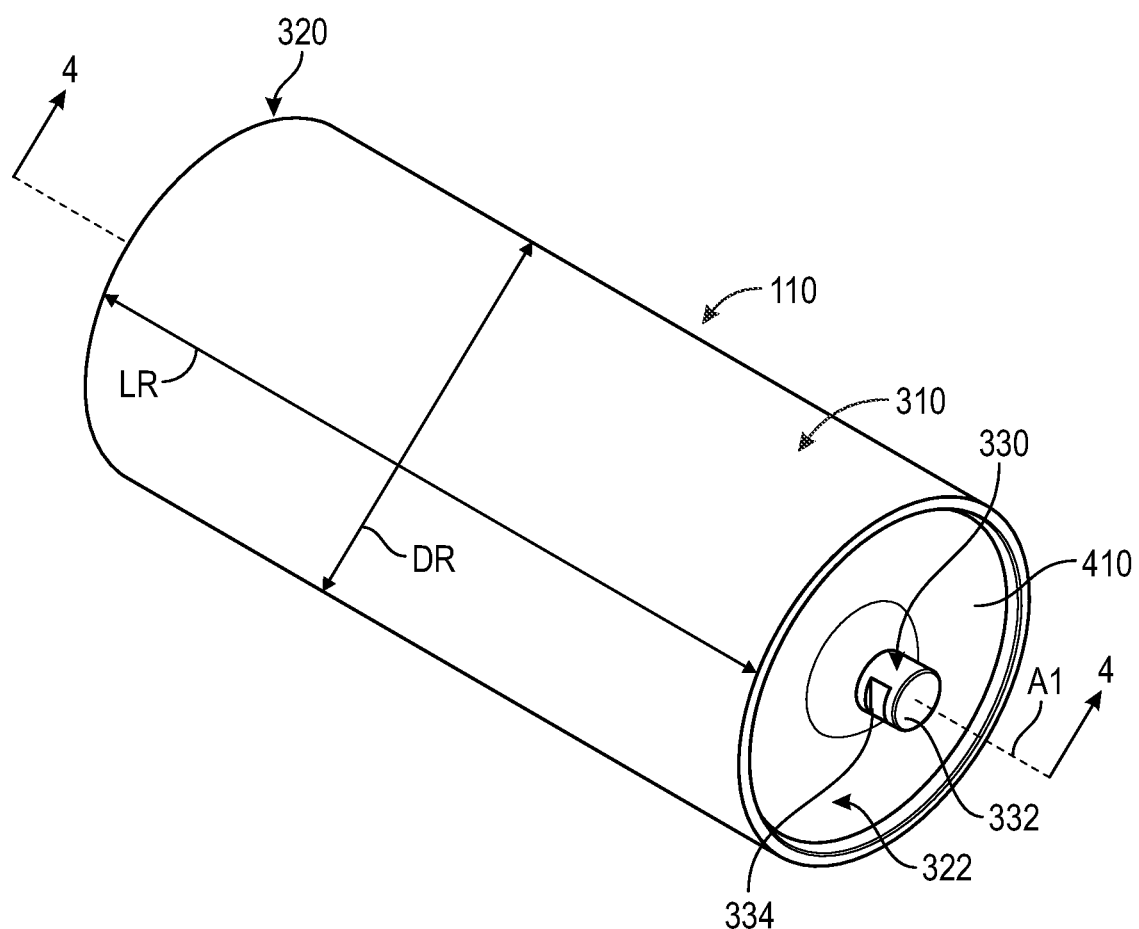
FIG. 3 is a perspective view of an exemplary idler from the assembly of FIG. 1.
Figure 4:
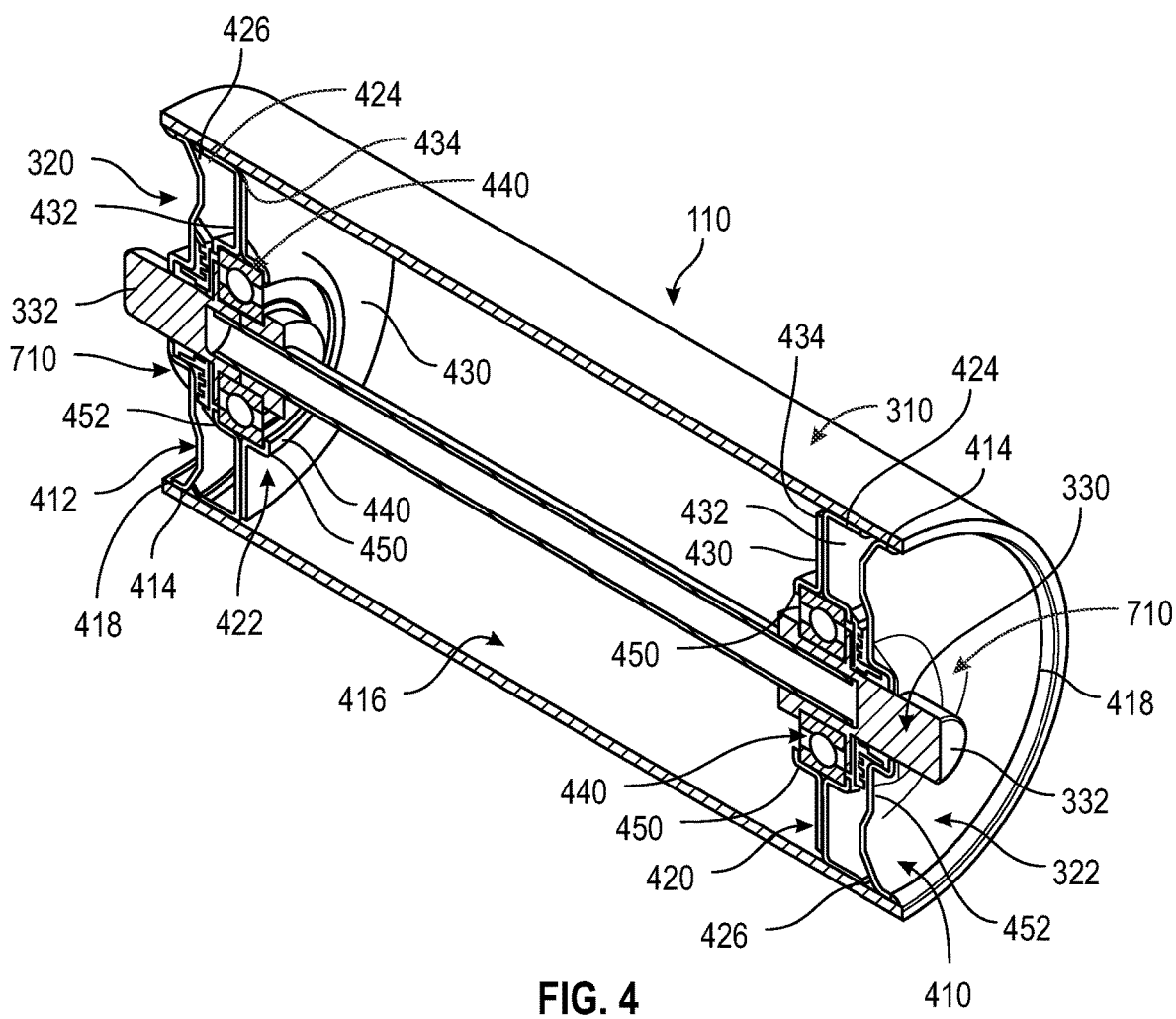
FIG. 4 is cross-section view of the idler taken along line 4-4 of FIG. 3, showing an exemplary five-piece shaft according to an embodiment.
Figure 5:
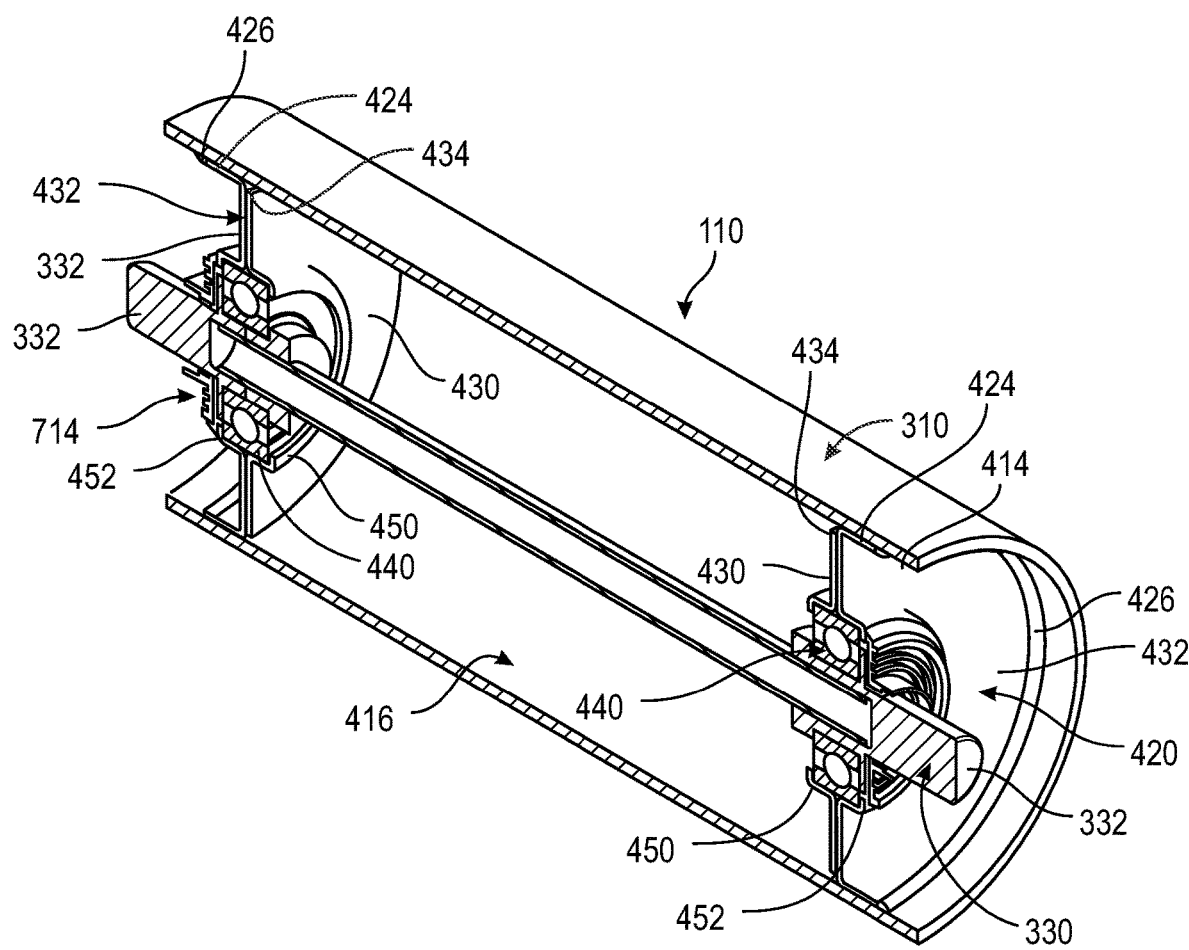
FIG. 5 is a cross-section view of the idler of FIG. 4 with each of opposing end caps removed to expose the inner labyrinth seals, respectively.
Figure 6:
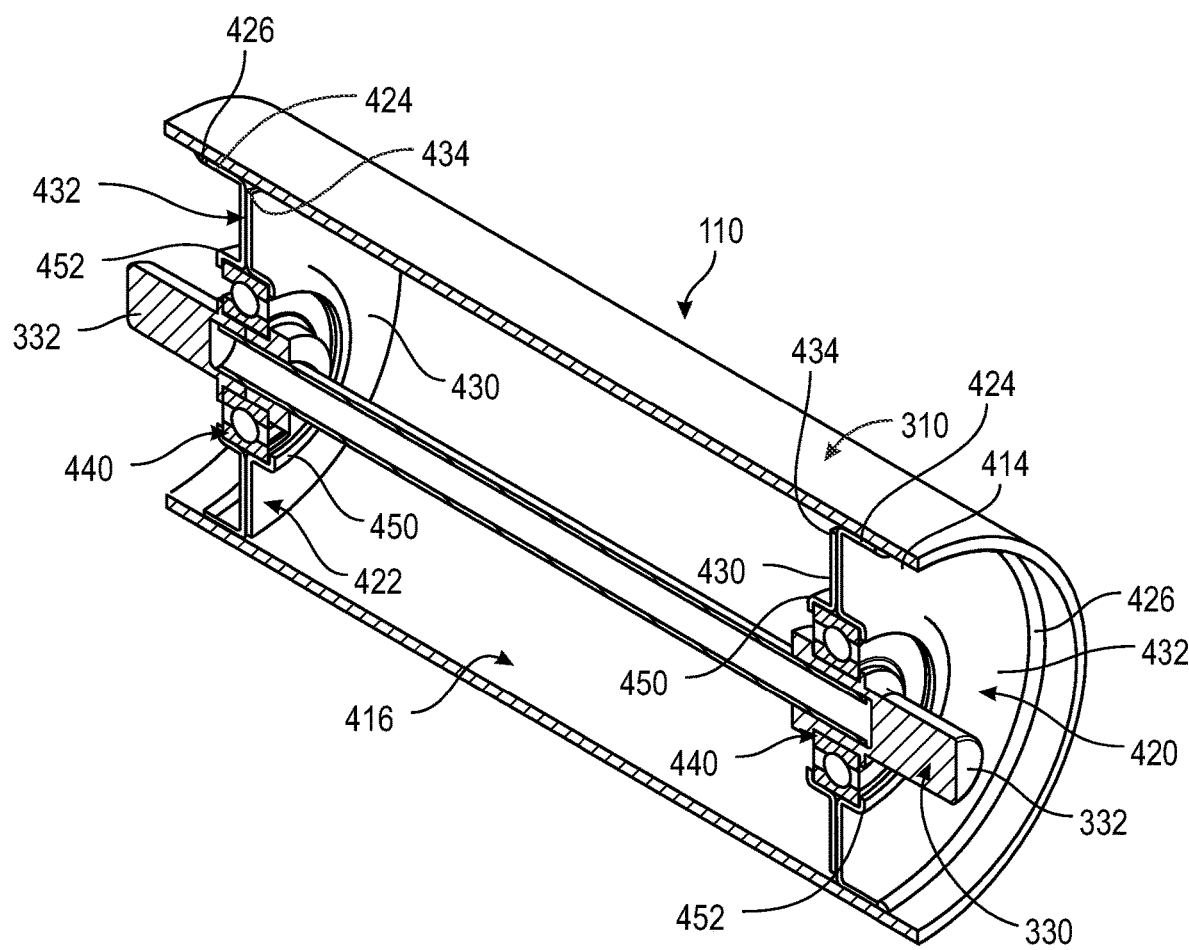
FIG. 6 is a cross-section view of the idler of FIG. 4 with each of opposing end caps and inner labyrinth seals removed to expose each of the sealed bearings, respectively.

One of the exemplary idlers (idler 110 depicted, with idler 112 and 114 being similarly or identically constructed herein) is shown in external detail in FIG. 3. The idler 110 includes an outer, cylindrical sleeve 310 of an appropriate material (e.g. steel and thickness (e.g. approximately 0.1-0.3 inches) with opposing roller ends 320 and 322 that encircle the stationary, axle or shaft 330. The diameter DR and length LR of the idler 110 are highly variable. In an exemplary embodiment the diameter DR is between approximately 3 inches and 10 inches, and the length LR is between approximately 6 inches and 60 inches.

The end shaft 332 (described further below) includes a keyway slot 334 on each of opposing sides thereof to removably engage a similarly sized slot formed in each of the risers 124, 126, 130 and 132, as described further below.

II. Idler Bearing and Seal Assembly

With further reference to FIGS. 4-8, the novel bearing seal arrangement(s) according to the exemplary embodiment are shown and described in detail. The sleeve 310 surrounds opposing end caps 410 and 412, from which project the opposing end shafts 332. The end caps 410, 412 comprise stamped metal disks are attached permanently to the inner surface 416 of the sleeve 310 using (e.g.) circumferential welds 418 between the inner surface and the end caps outer flange 414. Another metal-to-metal fastening technique can be employed in alternate embodiments—e.g. resistance welds, soldering, adhesive bonding, etc. Interior to each of the end caps 410 and 412 are respective bearing subassemblies 420 and 422. The subassemblies engage the inner surface 416 of the sleeve 310. They can also be affixed to the sleeve inner surface 416 by the engagement between the surface and a flange 424 and a circumferential weld 426 (or other metal-to-metal attachment technique).

The bearing subassemblies 420 and 422 each consist of an inner stamping 430 and an outer stamping 432. The inner stamping 430 defines an outer edge that is radially inward of the inner surface 416 of the sleeve 310. The outer stamping 432 carries the flange 424. By way of non-limiting example, the stampings 430 and 432 are formed from stamped sheet steel having a thickness of between 0.040 and 0.100 inch. They capture a commercially available sealed bearing unit 440 in adjoining drawn pockets 450 and 452 formed in the stampings 430 and 432, respectively. The inner and outer stampings 430 and 432, of each respective subassembly 420 and 422, are secured together along their confronting surfaces (radially outward of the drawn pockets 450, 452) by suitable metal-to-metal attachment techniques—for example resistance welds, brazing, adhesive bonding or a circumferential weld at inner plate edge 434. By way of non-limiting example, the construction techniques employed for forming and assembling the subassemblies 420 and 422 can be similar to those used to construct power transmission pulleys and the like. Note that the term "stamping", as used herein, should be taken broadly to define a variety of techniques for forming a cupped-shape as depicted, including, but not limited to, conventional and custom sheet metal stamping techniques.

With particular reference to the partial, enlarged, side cross-section of FIG. 8, the bearing unit 440 is sealed in a conventional manner (e.g. two rubber, or other elastomer, contact seals) with the inner race 810 press-fit over the end shaft 332 (in this case a two-piece assembly described below) and the bearing outer race 820 is captured within the drawn pockets 450 and 452 of the stampings 430 and 432. The races 810 and 820 are separated by rolling elements 830, as shown. The races are sealed against infiltration of contaminants using rubber/elastomer contact seals 840 on the inner and outer surfaces thereof.

The bearing unit 440 can be any conventional or custom (typically sealed) bearing. This can include ball bearings, cylindrical bearings, spherical bearings, or tapered roller bearings dependent on the application speeds and loads. The depicted bearing unit 440 can comprise, by way of non-limiting example, a model 6204NN1S2, available from New Hampshire Industries of Claremont, N.H., ball bearing with a bore diameter of 20 millimeters, and an outside diameter of 47 millimeters, nominally. It should be clear that this bearing model, type and/or size is one of many different models, types and/or sizes of bearings that can be used with the same (as depicted) or different sizes of idlers according to this invention. Also notably, the structure of the subassembly, shaft and end caps makes possible the use of larger diameter bearings than possible with a conventional idler roller design.

Figure 7:
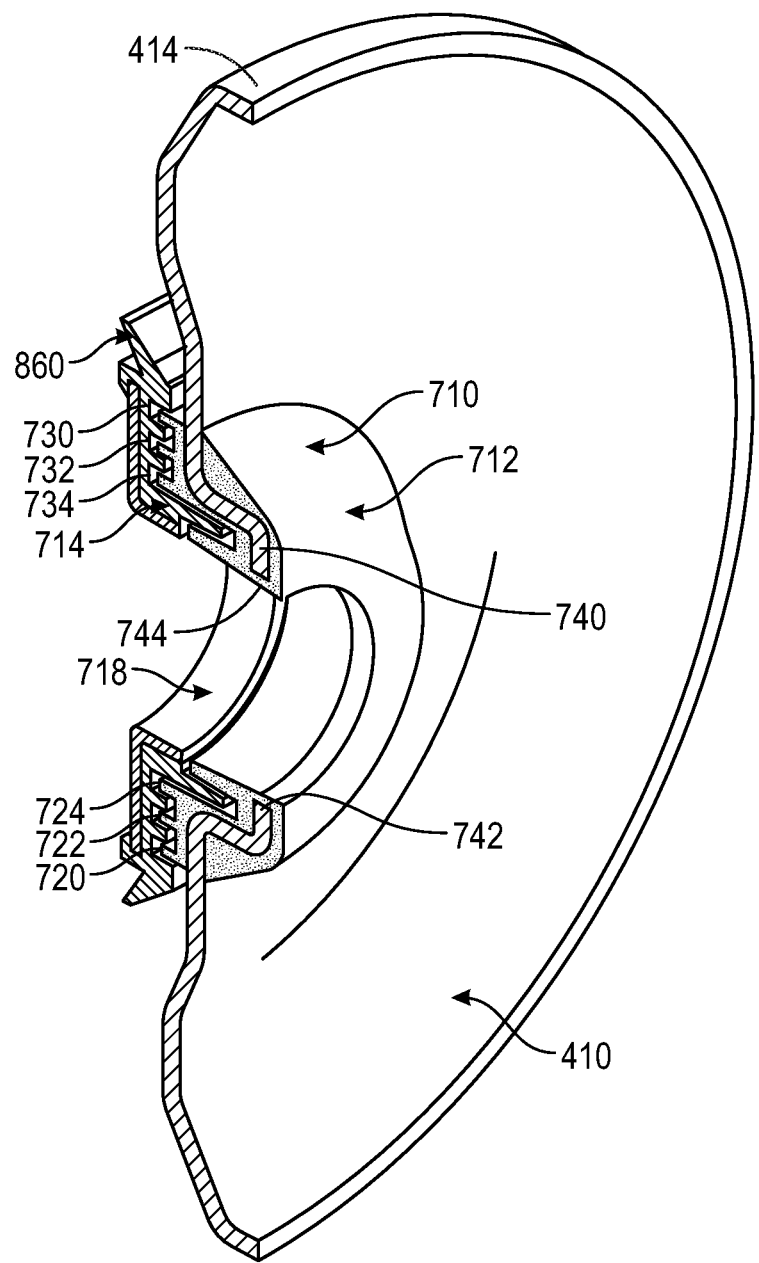
FIG. 7 is a perspective, cross-section view of an end cap of the idler of FIG. 4 showing inner and outer labyrinth seals.

It is noted that such bearing seals 840 are limited in their ability to prevent infiltration between the races of grit and contaminants likely to be encountered in a conveyor environment over a long duration of exposure. With reference also to FIG. 7, to further protect the bearings 440, the cap 410 includes an overmolded polymer (e.g., Nylon 66, or any other acceptable durable material, such as Polypropylene, Delrin, Teflon, etc.) seal assembly 710 that defines an internal labyrinth-type geometry. The polymer seal assembly 710 consists of an outer seal 712 molded onto the inner diameter of the cap 410, and an intermeshed inner labyrinth seal 714, molded on a metal base 716, that engages the end shaft 332 in a press fit with the inner ring/flange 718 of the base 716. Note that inner diameter of the cap 410 is formed with an outwardly directed cup shape 740 to assist in supporting the overmolded outer seal 712. The innermost rim 742 of the cup 740 is larger in diameter than the outer diameter DA (FIG. 8) for the end shaft 332 so that the outer seal 712 can surround it at an inner diameter region 744 (that is approximately 0.1-0.2 inch in thickness), which acts as a non-contact first line of defense (barrier) against contamination.

The labyrinth geometry of the polymer seal 710 consists of three radial, inwardly directed coaxial rings 720, 722 and 724 on the outer polymer seal 712. These rings 720, 722 and 724 seat, in an intermeshed relationship, with three respective wells 730, 732 and 734 formed on the inner labyrinth seal 714. The rings and wells of the labyrinth are sized and arranged at a spacing from each other so as to avoid binding during rotation—in which the outer seal 712 rotates with the sleeve 310, subassembly stampings 430, 432 and end caps 410, while the inner seal labyrinth 714 remains rotationally stationary/fixed with the shaft 330. In various embodiments, the space between the rings 720, 722 and 724 and wells 730, 732 and 734 are filled with grease for (in part) added contamination resistance. The labyrinth geometry provides an effective barrier to inward infiltration of contaminants given its inwardly radial and axial path. As shown in FIG. 8, the outer seal 712 further defines a non-contacting, minimal clearance annular sealing surface 822 that rotates relative to the stationary axle outer surface 824 contact surface. Thus, contaminants must first penetrate this seal to enter the labyrinth. Moreover, and uniquely, the interior space 850 (FIG. 8) between the bearing subassembly 420 and cap 410 provides a large volume in which any contaminants that infiltrate the labyrinth can reside as they are driven outwardly away from the center of the idler by centripetal forces of idler rotation. Thus, the arrangement of seals and interior spaces uses the physics of rotational motion to avoid inward infiltration of contaminants into the bearing assembly 440. Should any contaminants reach the center of the idler, they are further blocked by contact surface 860 on the (stationary) inner labyrinth seal 714 that engages the outer surface of the (rotating) bearing pocket 452. Only after penetrating this seal, can contaminants confront the bearing seals 840, themselves. Hence, by providing three discrete seals and a pathway that is directed radially outward, the arrangement herein provides superior resistance against contamination of bearings.

Figure 8:
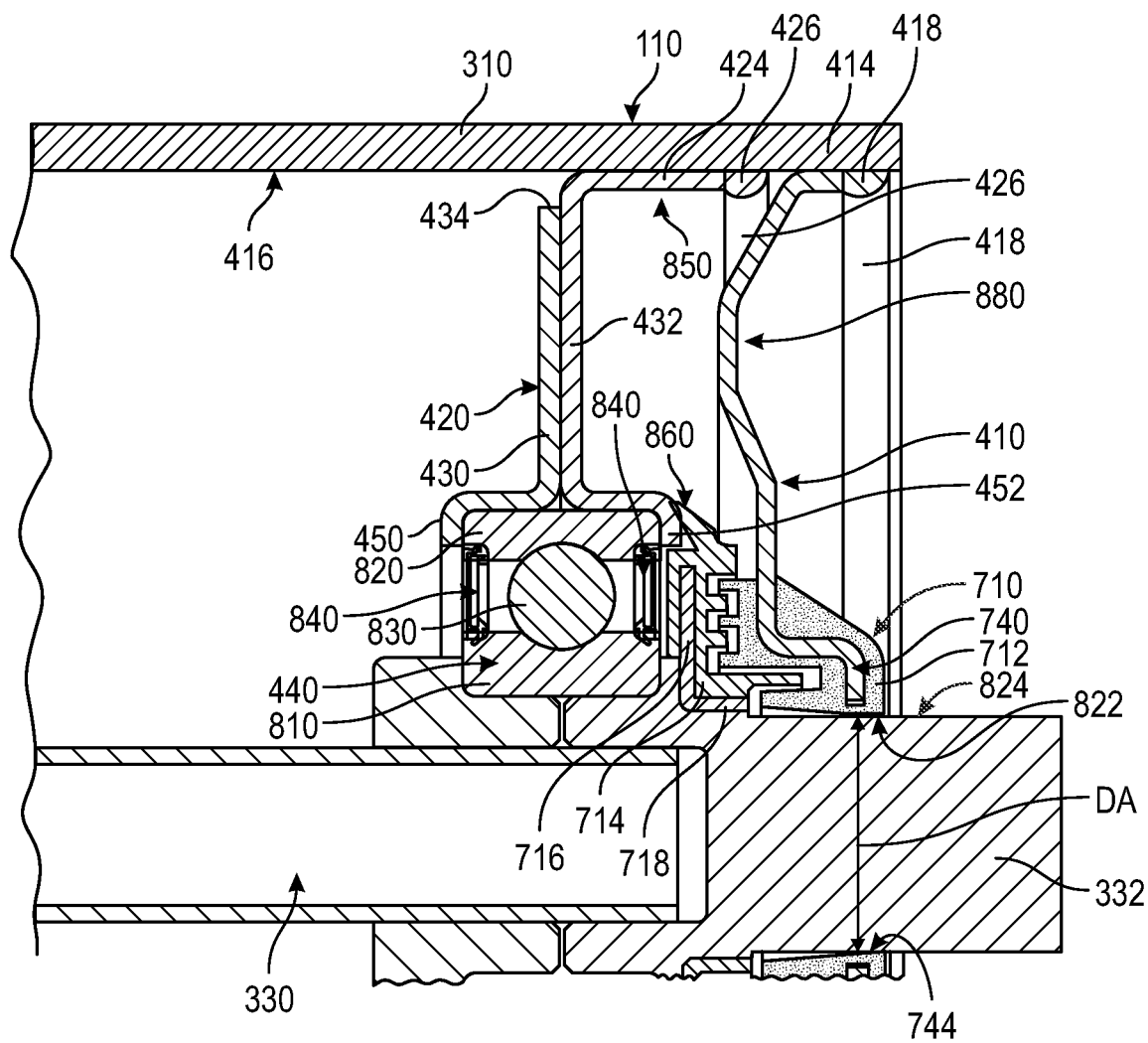
FIG. 8 is a partial, front cross-section of the idler of FIG. 4 detailing the sealed bearing structure, end cap and associated inner and outer labyrinth seals.

As also shown in FIG. 8, the cross-section geometry of the end cap 410 (and 412) defines a (optional) circumferential indentation 880 of predetermined depth, with a trapezoidal profile as shown. The indentation 880 provides clearance relative to the risers and external debris, and also increases the strength of the end cap by defining a strengthening rib in its geometry. In general, the cross-section profile of the end cap is highly variable in alternate embodiments. It generally includes a central folded structure (cup shape 740) suitable to retain the overmolded seal 712 and a radially outermost structure that facilitates attachment in a sealed manner to the inner surface of the idler sleeve 310

Note that, in alternate embodiments, greater or fewer contacting seals can be defined in the polymer seal assembly. Likewise, the number of rings and wells in the labyrinth geometry can be varied to provide a number that is greater or less than the depicted three. Likewise, the overall diameter of the labyrinth seal arrangement is highly variable, as are the individual thicknesses of the rings and wells. In an embodiment, the diameter of the ring/well (inner 714) portion of the labyrinth seal 710 is between approximately 0.75 inch and 4.0 inch across a wide range of applications. However, the depicted model can represent a ring/well diameter in a range of between 0.80 inch and 1.5 inch. Other formations (in alternative/addition to the depicted labyrinth, etc.) that redirect, and/or add complexity to, the radial pathway for contaminants within the idler interior can also be provided in alternate embodiments.

III. Multi-Piece, Press-Fit Axle

Figure 9:
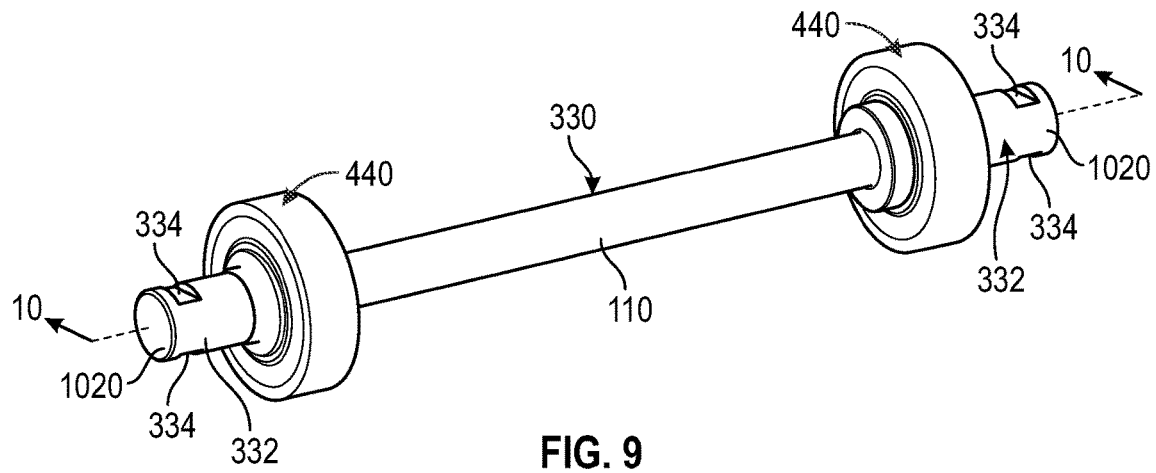
FIG. 9 is a perspective view of the five-piece shaft of FIG. 4 with the idler sleeve, end caps and surrounding stampings of the opposing bearing sub-assemblies removed to expose the sealed bearing units, respectively.
Figure 10:
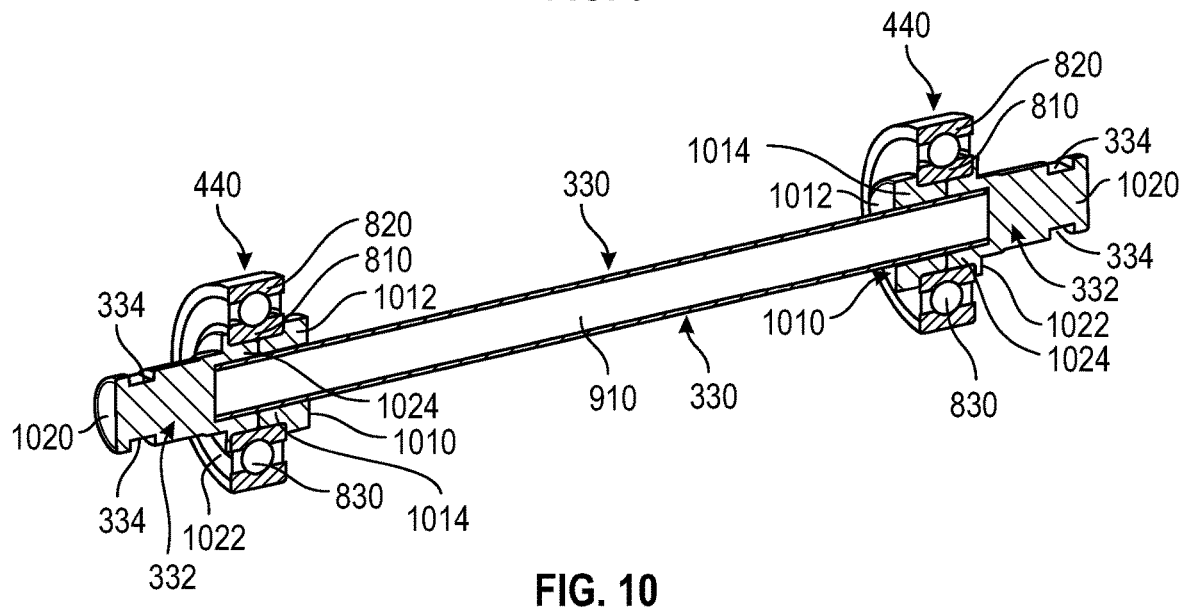
FIG. 10 is a cross-section view of the depicted five-piece shaft and bearing assembly of FIG. 10.
Figure 11:
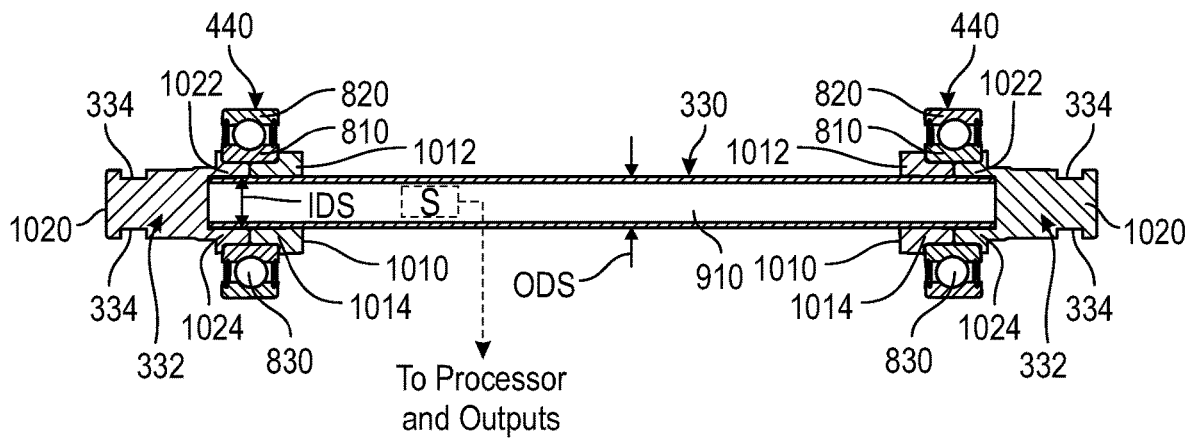
FIG. 11 is a front cross-section view of the five-piece shaft and bearing assembly shown in FIG. 10.

With reference to FIGS. 9-16 an axle shaft arrangement for supporting the rotation bearing subassembly, end caps and sleeve within a framework is shown and described according to a plurality of exemplary embodiments. The embodiment of FIGS. 9-11 shows the above-depicted five-piece axle/shaft arrangement 330. This arrangement 330 comprises a central shaft portion 910 that is either a hollow (as shown) tube or solid. It can be constructed from any acceptable material, such as steel alloy (e.g. 0.049 inch wall thickness, 0.5 (½) inch diameter 1020 seamless tube). Solid axles can be constructed from (e.g.) steel alloy, or another metal, bar stock. A variety of hollow materials (in varying diameters, thicknesses, etc.) can be used, including various metals and alloys, in either a seamed or seamless tube construction. Notably, the end shafts 332 are constructed to be press-fit onto opposing ends of the central shaft portion 910—and are attached in a manner that is free of welding, swaging, crimping, fasteners or other secondary attachment mechanisms. The opposing end shafts 332 are maintained axially with respect to the central shaft portion 910 by the bearing substructures 420 and 422, which are axially fixed to the sleeve 310 by welds as described above, and hence, constrain any outward movement of the end shafts 332 relative to the central shaft portion 910. The end shafts can be constructed using a variety of techniques, and/or combinations of techniques. For example, they can be cast, machined from bar stock, or they can be constructed using powdered/sintered metal techniques that can reduce manufacturing costs.

More particularly, the end shafts 332 of this exemplary embodiment consist of solid steel alloy, machined units defining an inner end shaft 1010 and outer end shaft 1020. The inner end shaft(s) 1010 define a stop (raised annulus) 1012 that prevents inward axial movement of the bearing 440, which is partially seated on a bearing seat 1014 formed on the outwardly facing side of the inner end shaft 1010. Each outer end shaft 1020 abuts the inner end shaft 1010, and provides the remainder of the seat 1024 for each, respective bearing 440. Each outer end shaft also includes an outer flange 1022, which prevents outward axial motion of the bearing 440. Thus, when fully assembled, as depicted, the annular stop 1012 and flange 1022 axially retain each confronting bearing 440. The inner and outer ends shafts 1010 and 1020 define an inner diameter IDS (FIG. 11) that is slightly smaller than the outer diameter ODS of the central shaft 910. Once subassemblies 420 and 422 are constructed around the bearings, the entire assembly, including end shafts 1010 and 1020 can be press-fit onto the end of the central shaft portion. In an exemplary embodiment, the central shaft outer diameter ODS is approximately 0.500 inch and the end shaft inner diameter IDS is approximately 0.498 inch. This generates the desired interference fit. In alternate arrangements, the size of both the inner diameter IDS and the outer diameter ODS can vary in accordance with the overall idler size and performance characteristics. Likewise, the thickness (inner-to-outer diameter) of the bearing seats 1014 and 1024 can vary, depending upon the inner diameter of the bearing assembly 440 and the required strength of the unit. In an embodiment, the seat thickness can be between 0.1 and 0.4 inch. The seats 1014 and 1024 are sized in outer diameter to facilitate an interfering, press-fit from both sides with respect to the inner race/inner diameter of the bearing 440. In this manner, the end shafts 332 can be assembled with bearings prior to press fit of the entire subassembly onto the end of the central shaft 910.

Described more generally, the press-fit between components herein is performed by way of the nominal component dimensions and tolerance (that is, a larger outer diameter pressed into a smaller inner diameter). This differs from prior art designs, such as that taught in U.S. Pat. No. 9,359,144, entitled MULTI-PIECE SHAFT, issued Jun. 7, 2016, in that the present embodiments are advantageously free of (omit) any secondary swaging, roll-forming, crimping, welding, brazing, etc.

Notably, the use of a hollow shaft design facilitates mounting of sensor assembly (represented schematically as S), which can be interconnected with appropriate monitoring and alert systems (for example, a data acquisition component operatively connected with a PC, server, laptop, etc.), running an appropriate software application. By way of non-limiting example, the sensor assembly S can be arranged to optically and/or mechanically read rotation (motion) of the sleeve (and generate, e.g., encoder pulses based on rotation rate)—for example via an optical port in the shaft, or can otherwise sense motion, vibration, and the like, to determine idler performance and/or operational status. The sensor can be uniquely identified and/or addressed so that each idler in the conveyor system is separately identified. This can assist personnel monitoring the system in performing maintenance and/or replacement of that idler. The particular size, mounting arrangement and placement of the sensor is, thus highly variable, and can also include appropriate sensing components on other portions of the idler, such as (e.g.) an optical reflector on the inner sleeve.

Figure 12:
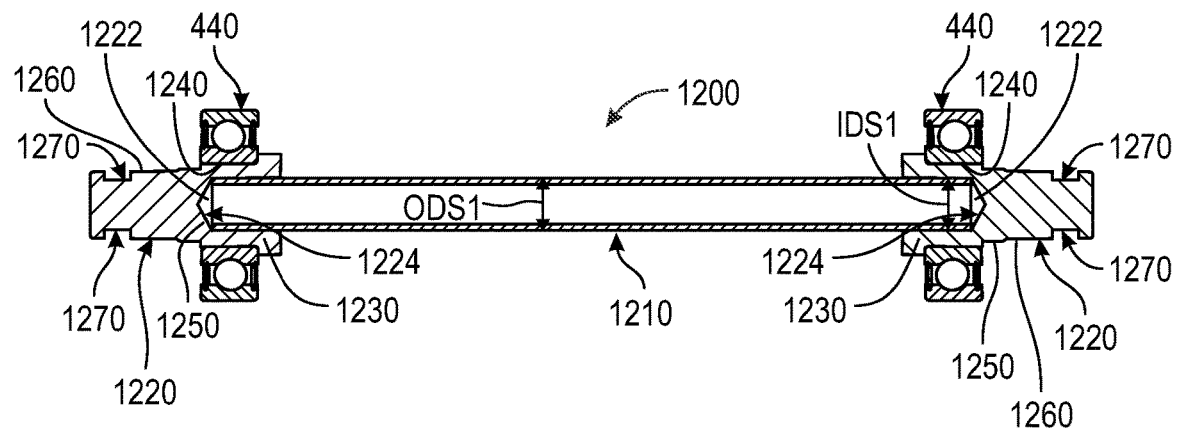
FIG. 12 is a front cross-section view of a three-piece shaft and bearing assembly, with end shafts thereof pressed into the bearing bore from inside-out, for use in the idler, according to another embodiment.

In another exemplary embodiment, shown in side cross-section in FIG. 12, the shaft and bearing arrangement defines a three-piece shaft assembly 1200 with end shafts 1220 pressed into the bearing 440 from inside-out comprised of center shaft portion (solid core or hollow-tube) 1210. The end shafts 1220 are attached to the opposing ends of the center shaft 1210 using an interfering inner/outer diameter press-fit as described above. As in other end shaft designs herein, the center end shafts abut an internal wall 1224 formed in the bore 1222 of each end shaft 1220 to restrain further inward axial motion relative the center shaft 1210. As noted, the bore inner diameter IDS1 is slightly smaller than the shaft outer diameter (ODS1) to facilitate the desired press fit. The depth of the bore 1222 can vary depending upon the strength of the interconnection between the center shaft 1210 and end shafts 1220. In an embodiment, the bores 1222 extend at least partially beneath the respective, adjacent bearings 440.

The bearings 440 are restrained against inward axial motion by inner, annular shoulders or stops 1230. Similar to the five-piece design of FIG. 9 the end shafts 1220 include (single-piece) bearing seats 1240, having an outer diameter that establishes an interfering, press-fitment with respect to the inner race/diameter of the bearing 440. Like the above-described two-piece end shafts 332, the end shafts 1220 in the embodiment of FIG. 12 can (in some embodiments) include outwardly, progressively smaller outer stepped diameters 1250 and 1260. In alternate embodiments, the diameter 1250 can be omitted and the seal is press-fit directly onto the diameter 1260. The first stepped diameter 1250 (closest to the bearing seat 1240) is sized to receive the metal base flange/ring 718 of the above-described (stationary) inner labyrinth seal 714 (See FIG. 7). The outermost and smallest, stepped outer diameter 1260 is adapted to engage the sealing surface 822 (See FIG. 8) of the rotating, co-molded outer labyrinth seal 712. This outermost/smallest stepped outer diameter 1260 extends to the outer end of each end shaft 1220. This diameter 1260 also carries the (e.g., machined) keyway slots 1270 for engaging the risers of the support frame 120 (described above in FIGS. 1 and 2, and further below).

Figure 13:
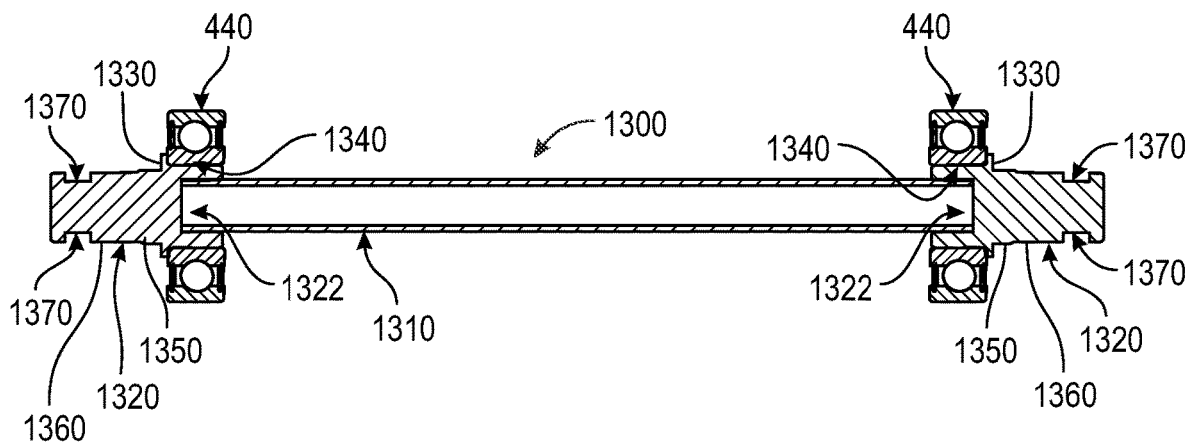
FIG. 13 is a front cross-section view of a three-piece shaft and bearing assembly, with end shafts thereof pressed into the bearing bore from outside-in, for use in the idler, according to another embodiment.

Yet another embodiment of a shaft assembly 1300, which defines a three-piece arrangement, with end shafts 1320 pressed into the respective bearings 440 from outside-in, is shown in FIG. 13. The end shafts 1320 are, likewise press-fit onto the opposing ends of the center shaft 1310 (either solid core or a hollow tube, as described above). The end shafts 1320, respectively, receive the bearings 440 in a press-fitment between their inner races/diameters and the end shaft seats 1340. The bearings abut, and are axially retained by an external, annular shoulder 1330. The bore 1322 of each end shaft 1320 is of sufficient depth to provide mechanical strength to the interconnection between the components. An appropriate interference fit between the outer diameter of the shaft 1310 and the bore 1322 is defined, in a manner generally described above. Outwardly, and progressively smaller stepped diameters 1350 and 1360 are also provided on the end shafts (outward of the shoulder 1330) to seat the labyrinth seal components, as described above. The outermost stepped diameter 1360 can include keyway slots 1370, as also described above.

Figure 14:
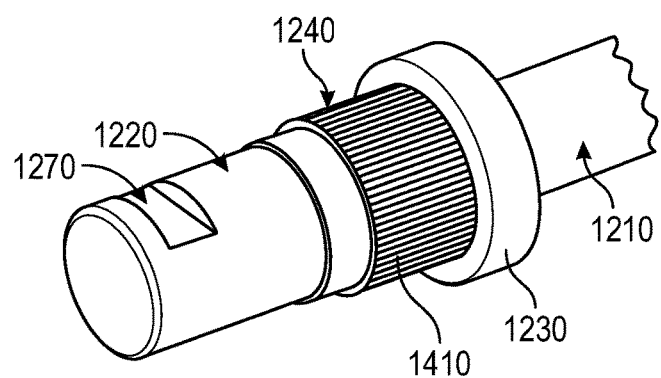
FIG. 14 is a partial perspective view of a shaft assembly with end shaft (e.g. according to FIG. 12) having an exemplary, serrated bearing press-fit surface.
Figure 15:
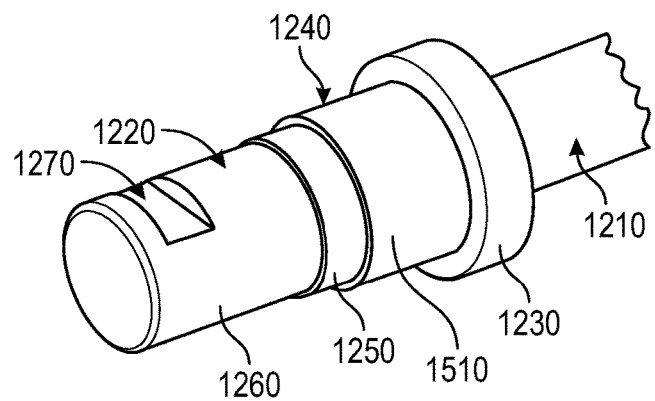
FIG. 15 is a partial perspective view of a shaft assembly with end shaft (e.g. according to FIG. 12) having an exemplary, smooth bearing press-fit surface.

It is contemplated that the surface finish of the bearing seat for any of the end shaft embodiments contemplated herein (and/or other components requiring a press-fitment) can vary widely. FIGS. 14 and 15 show alternate surface finishes for the bearing seat 1240 on the exemplary end shaft 1220, shown in FIG. 12. As depicted in FIG. 14, the seat 1240 defines a splined or knurled surface finish 1410—which can be formed using conventional machine tools and/or other processes. This finish provides further rotational and axial holding strength between the bearing and the seat. Conversely, a smooth and/or grit/bead-blasted surface finish 1510 can be provided to the seat 1240, as shown in FIG. 15. As defined herein, any surface finish other than a "smooth" (i.e. one that relatively free of depth variation), should be considered "textured" herein (i.e. one that has a degree of depth variation).

Figure 16:
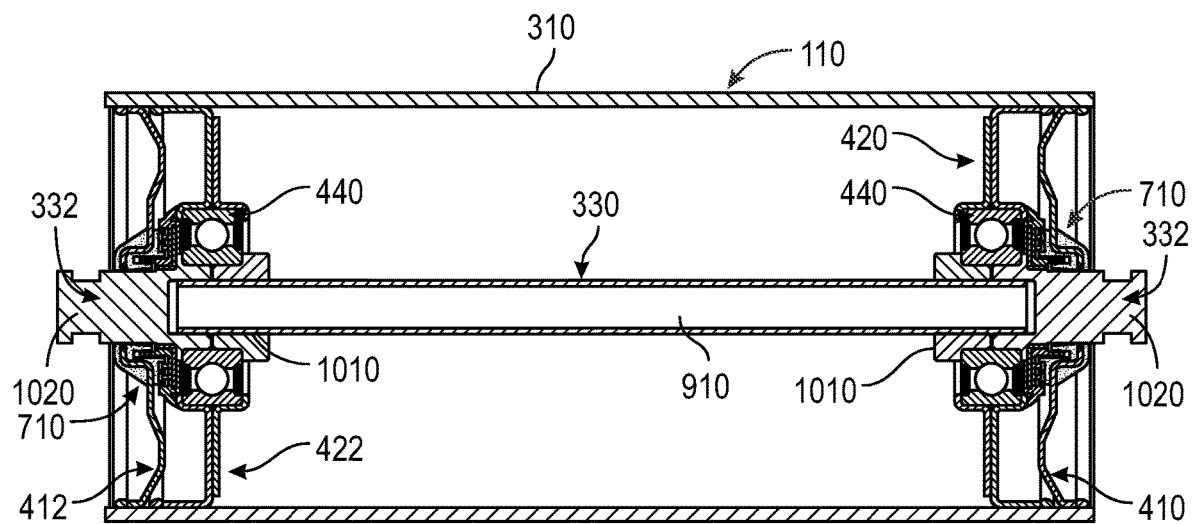
FIG. 16 is a front cross section of a complete idler assembly according to FIG. 4, having a five-piece shaft assembly.
Figure 17:
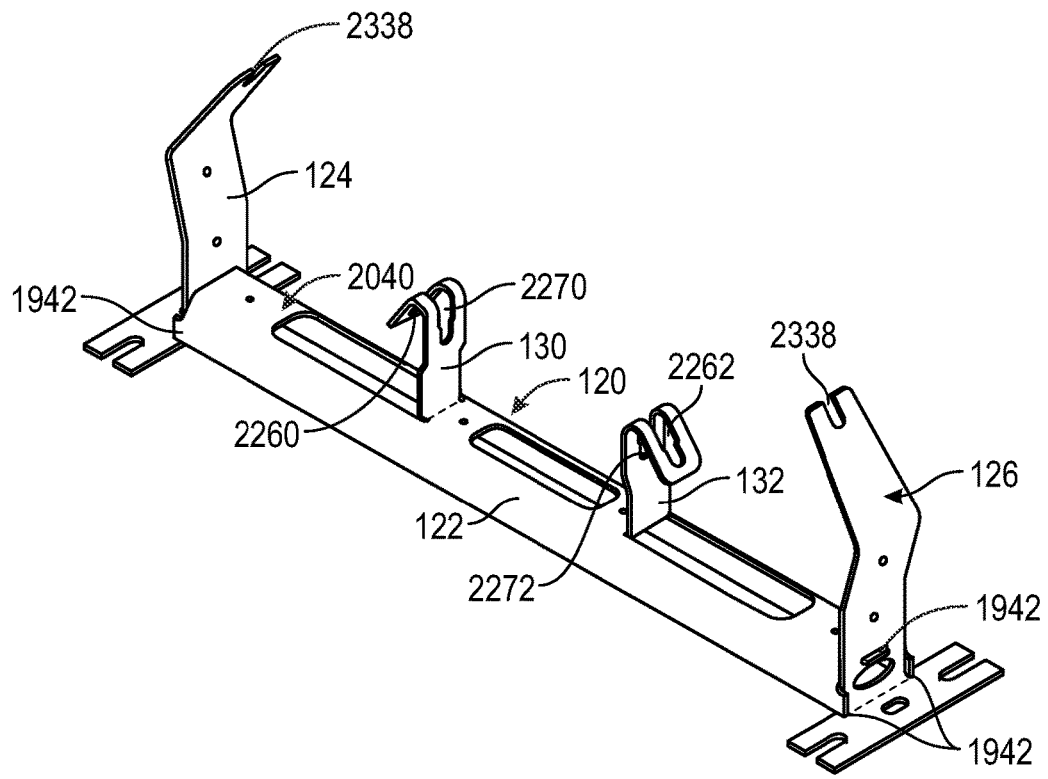
FIG. 17 is a perspective view of a stamped frame assembly for the idler assembly of FIG. 1.
Figure 18:
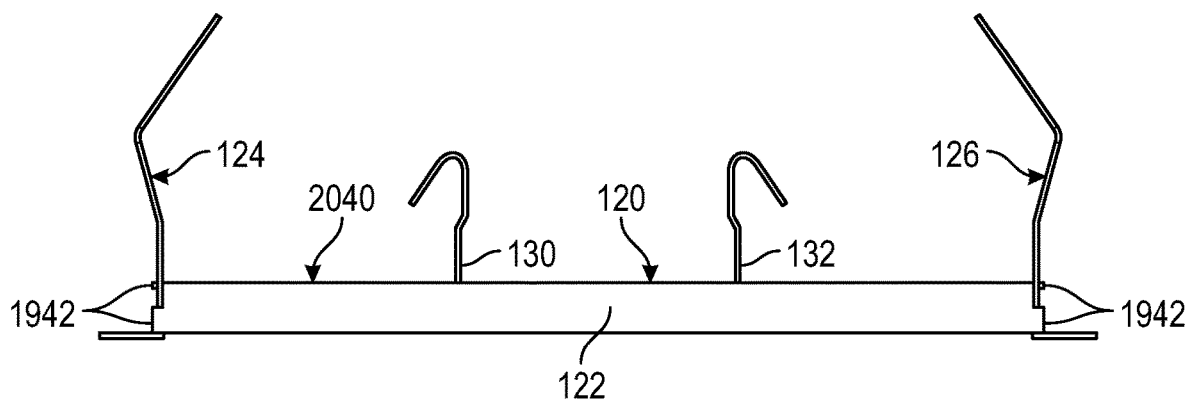
FIG. 18 is a front view of the stamped frame assembly of FIG. 17.

By way of further illustration, FIG. 16 is a complete side cross-section of the idler assembly 100 described above, having a five-piece shaft 330 according to the exemplary embodiment of FIGS. 9-11. Advantageously, the depicted idler assembly 110, and those employing the alternate press-fit shaft embodiments herein, allow for lighter shaft weight, larger bearings, and superior, external sealing when compared to conventional, prior art conveyor idler designs.

IV. Idler-Supporting Frame and Method for Construction

With reference again to FIGS. 1 and 2, FIGS. 17-26 further show and describe the construction of an idler-supporting frame assembly 120, for three idlers in a trough shape, according to an exemplary embodiment.

The frame assembly 120 can be constructed entirely from stamped sheet steel alloy (for example ASTM A1011 HRPO). The makeup and/or thickness of the sheet metal is highly variable—by way of example, 8 gauge sheet can be used in an exemplary embodiment.

Figure 19:
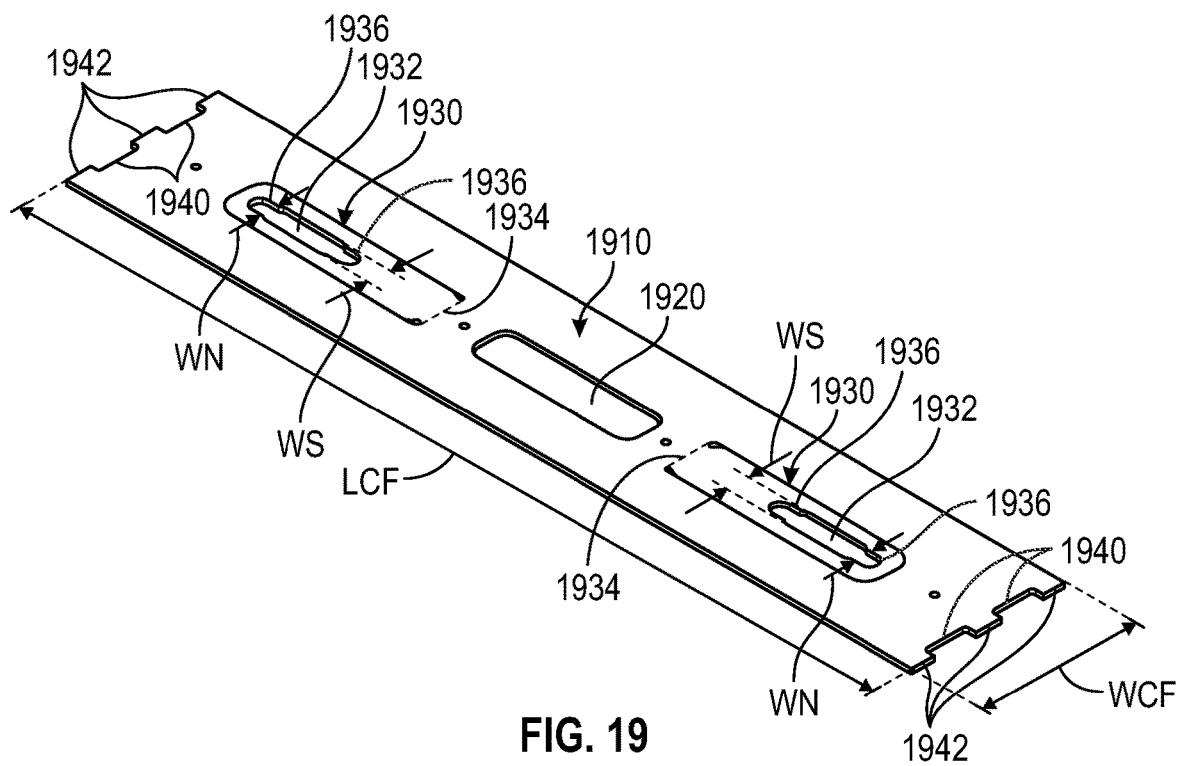
FIG. 19 is a perspective view of a stamped metal flat, from which the center section of the frame assembly of FIG. 18 is formed, according to a first manufacturing process step.

As shown in FIG. 19, the center section 122 begins as a flat blank 1910 of stamped or cut sheet metal having an (optional) elongated center slot 1920. The sheet metal can be cut using a stamp or programmed cutting device—for example, laser, plasma or waterjet. By way of non-limiting example, the flat blank has an overall length LCF of approximately 36 inches and an overall width of approximately 6 inches.

The internal cuts in the flat blank 1910 define two opposing riser tabs 1930 with central slots 1932. The slots 1932 have a width WS sufficient to receive outer diameter (distal of the keyway slots (e.g. slots 334)) in the idler end shafts (e.g. end shafts 332). At the opposing end of each slot 1932, there is a narrowed portion 1936, defining a width WN that is sided to receive the narrowed key formed by the flats in each end shaft slot. This arrangement thereby allows insertion of the end shaft into the widened portion (width WS) of the slot 1932, and then lateral (downward) sliding of the end shaft into engagement with the slot's narrowed (width WN) portion 1936, in a manner that restrains axial and rotational motion of the shaft with respect to the support assembly. The cuts in the sheet metal can be made in a manner that facilitates right-angle, upward bending as described below—thus appropriate stress reliefs, etc., can be provided at the uncut junction 1934, where a fold occurs. The flat blank 1910 also defines opposing end notches 1940 and tabs 1942. These features are used to attach the end risers 124 and 126, as described further below.

Figure 20:
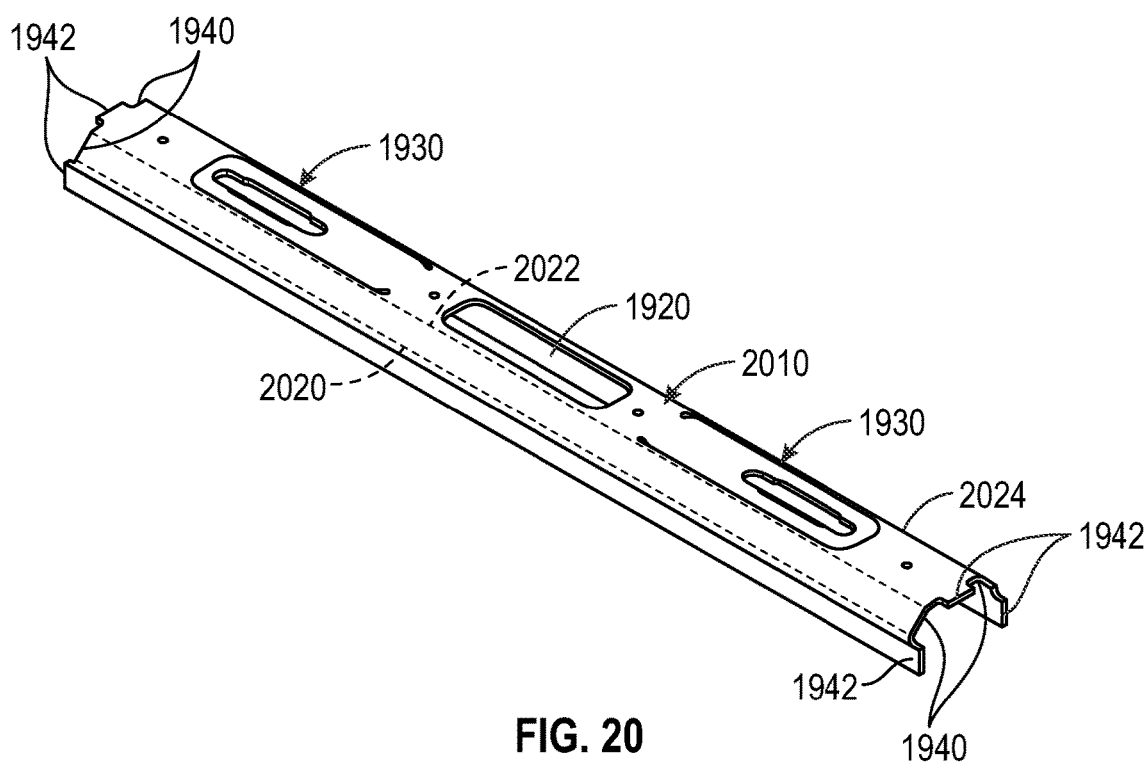
FIG. 20 is a perspective view of the center section of the frame assembly of FIG. 19 formed into an approximate inverted U-cross section beam shape in a second manufacturing process step.

In FIG. 20, the flat blank 1910 of the center section is folded into an inverted U-shaped (cross-section) beam 2010 using (e.g.) a conventional metal stamping and/or bending device and an appropriate form or jig (not shown). The longitudinal fold lines 2020, 2022 (shown in phantom) and 2024 are depicted, which define the "U" shape, with vertical sides 2030 and 2032, and a flattened/horizontal top surface 2040. The flattened top surface 2040 carries the two central riser cutouts 1930.

Figure 21:
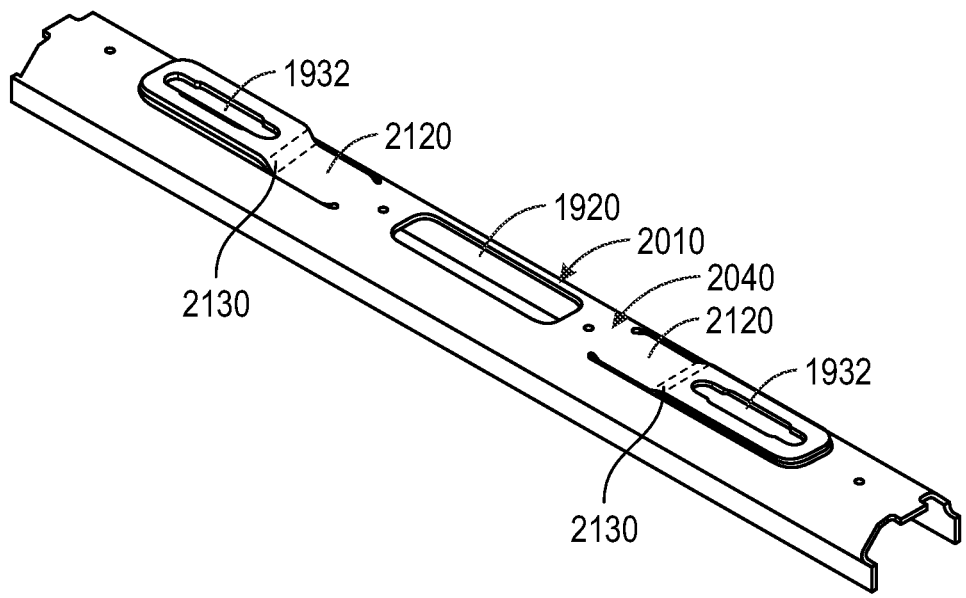
FIG. 21 is a perspective view of the center section of the frame assembly of FIG. 19, with offsets stamped into opposing uprights, respectively, in a third manufacturing process step.

In FIG. 21, the U-shaped beam 2010 is stamped to define offset segments 2130 in the central riser cutouts 2120. These offsets 2130 are located beneath the respective slots 1932 (between the inner end of each slot 1920 and the joint with the top surface 2040), so as to allow clearance for each of the completed central risers 130, 132 to carry opposing end shafts and keyways, as shown in FIGS. 1 and 2.

Figure 22:
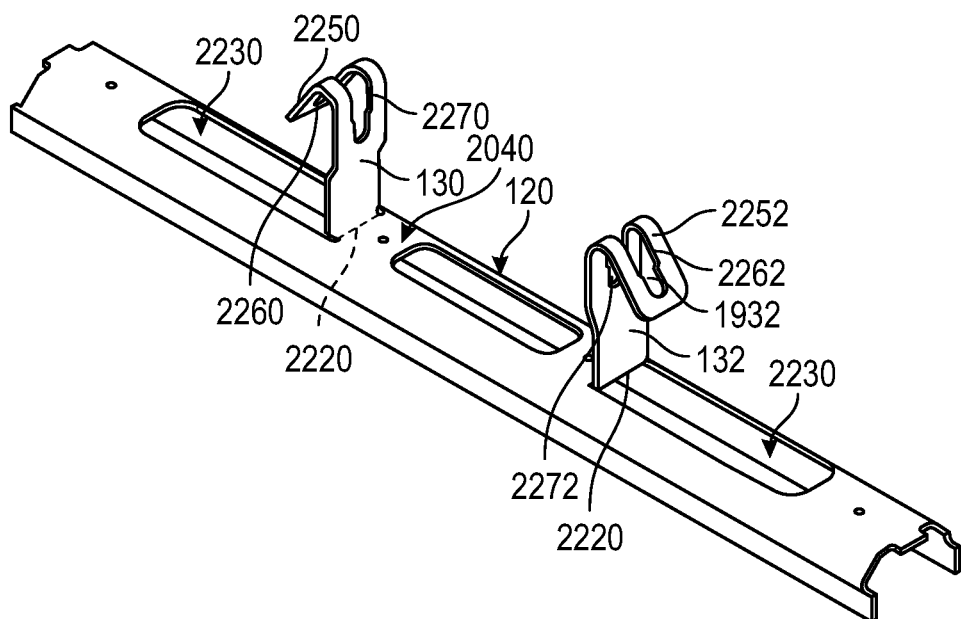
FIG. 22 is a perspective view of the center section of the frame assembly of FIG. 19, with the uprights bent upwardly and rolled over, in a fourth and a fifth manufacturing process step.
Figure 23:
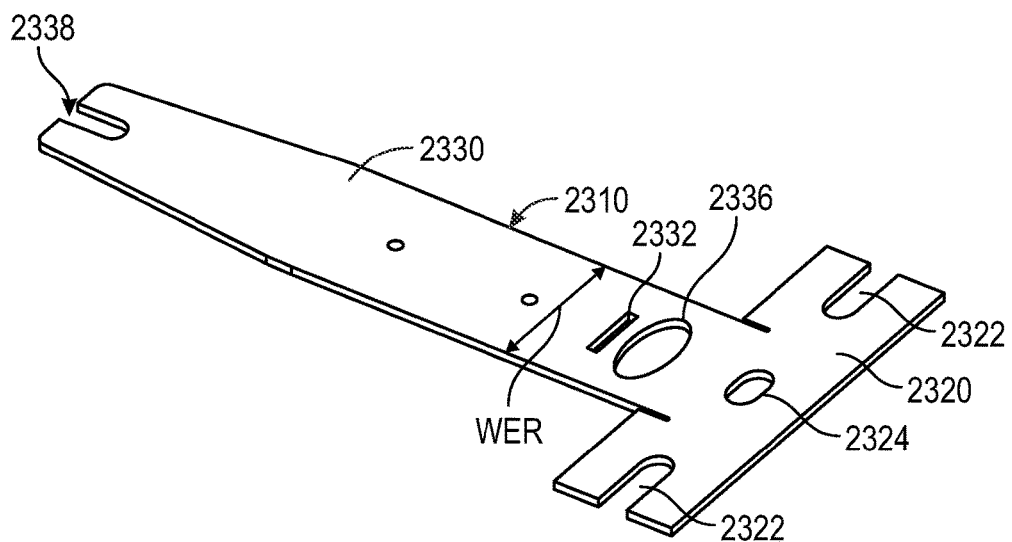
FIG. 23 is a perspective view of a stamped metal flat, from which one of two opposing end risers of the frame assembly of FIG. 17 is formed, in a first manufacturing process step.

In FIG. 22, the center section 122 is now completely formed. To finalize this shape, the risers with offsets 2130 are bent upwardly into a vertical (perpendicular to the plane of top surface 2040) orientation along fold lines 2220. Port holes 2230 remain in the top surface 2040 where the risers 130 and 132 have been bent upwardly. Additionally, the tips 2250 and 2252 of each of the risers 130 and 132, respectively, are bent over as shown, in opposing, outward directions so that each of the overall slots 1932 are divided into a pair of outer-facing slots 2260 and 2262 (at an acute angle) and a pair of inner-facing slots 2270 and 2272. Each of the slots is terminated at the bottom and open at the top—allowing a roller end shaft keyway to enter it and rest at the base of the slot when fully inserted.

To complete the frame assembly 120, the end risers 124 and 126 are constructed and attached to the center section 122. The end risers begin as a stamped or cut, flat blank 2310 from sheet metal in FIG. 23. The blank 2310 defines a T-shape, consisting of a base 2320 and a transversely extended, riser section 2330. The width WER of the lower end of the riser section 2330 is approximately equal to the spacing between tabs 1942 at the ends of the vertical sides 2030 and 2032 of the frame assembly's center section 122. As shown in the fully assembled frame 120 (See FIGS. 17 and 18) the edges of the riser section 2330 reside between side tabs 1942. The riser section also defines a cut or stamped slot 2332 that engages the tab 1942 that extends along the flat top surface 2040 of the center section 122. The riser section 2330 also includes a cut or stamped (e.g.) elliptical port 2336 that allows debris and moisture to pass out of the frame assembly 120. A slot 2338 is formed at the distal end of the riser section 2330. It is sized and arranged to receive a keyway slot in the idler end shaft described above.

The base section of the end riser blank 2310 is approximately rectangular includes mounting bolt slots 2322 and a central elongated bolt hole 2324. These can receive mounting bolts used to secure the frame assembly in a larger conveyor base structure (not shown), as part of a series of spaced-apart idler assemblies along the length of the conveyor belt.

Figure 24:
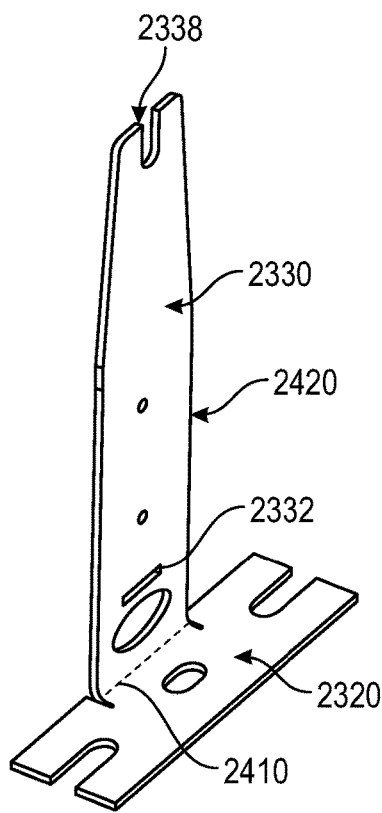
FIG. 24 is a perspective view of the end riser of the frame assembly of FIG. 17, with the riser portion bent at an approximate 90-degree angle to the base portion, in a second manufacturing process step.
Figure 25:
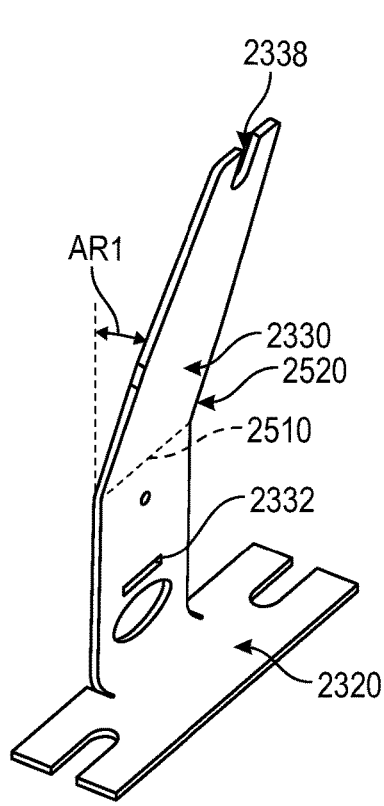
FIG. 25 is a perspective view of the end riser of the frame assembly of FIG. 17, with a lower, acute-angle bed formed in the riser portion, in a third manufacturing process step.

FIG. 24 shows the end riser blank 2310 bent along a fold line 2410 in a first bend operation that forms the initial bent structure 2420. The riser section is oriented perpendicularly to the base 2320 as shown. Then, in FIG. 25, the first bent structure 2420 is then bent toward the base 2320, along an intermediate fold line 2510 on the riser section 2330, to an acute angle AR1 of between (e.g.) approximately 5 and 15 degrees relative to the vertical. This bend thereby defines an initial bent section 2520 as shown.

Figure 26:
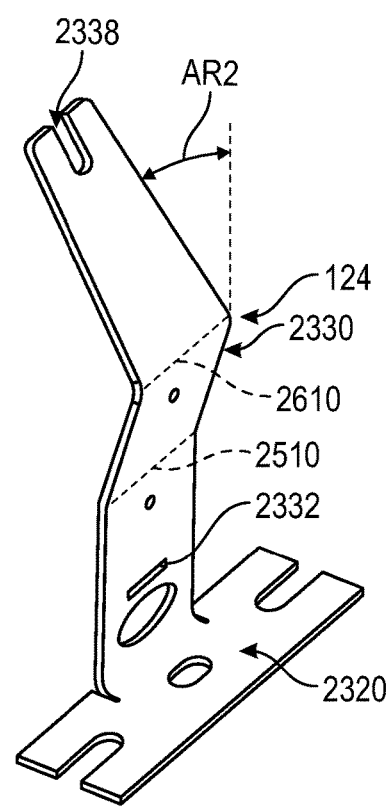
FIG. 26 is a perspective view of the end riser of the frame assembly of FIG. 17, with an upper, oppositely-directed, acute-angle bend formed in the riser portion, in a fourth manufacturing process step.

In FIG. 26, a second bend on the riser section at a fold line 2610, above the first fold line 2510, directs the upper portion of the (along initially bent section 2520) riser section 2330 away from the base at an acute angle AR2 that is between (e.g.) approximately 20 to 45 degrees relative to the vertical. This completes formation of the end riser 124 described above. The end riser is symmetrical so that it can be used on either side of the center section 122 of the framework 120. Hence, end risers 124 and 126 on each side of the framework assembly 120 can be identical.

Attaching the end risers 124, 126 to the center section 122 entails aligning the riser edges and slot 2332 with appropriate tabs 1942 on the end of the center section and permanently affixing those together using (e.g.) appropriate welding techniques between adjacent metal edges and/or joints. The resulting structure is strong, lightweight and easily serviced.

V. Alternate Shaft-Mounting Arrangement

Figure 27:
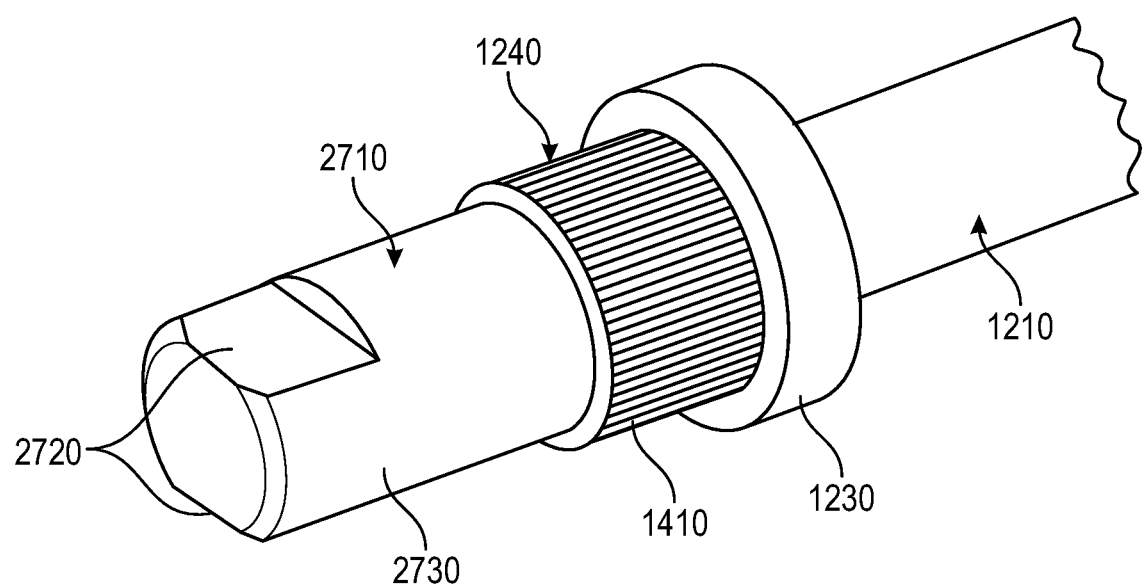
FIG. 27 is a partial perspective view of a shaft assembly with end shaft (e.g. similar to FIG. 12) having an exemplary, serrated bearing press-fit surface and keyway flats that extend distally to the end of the end shaft, according to an alternate embodiment.
Figure 28:
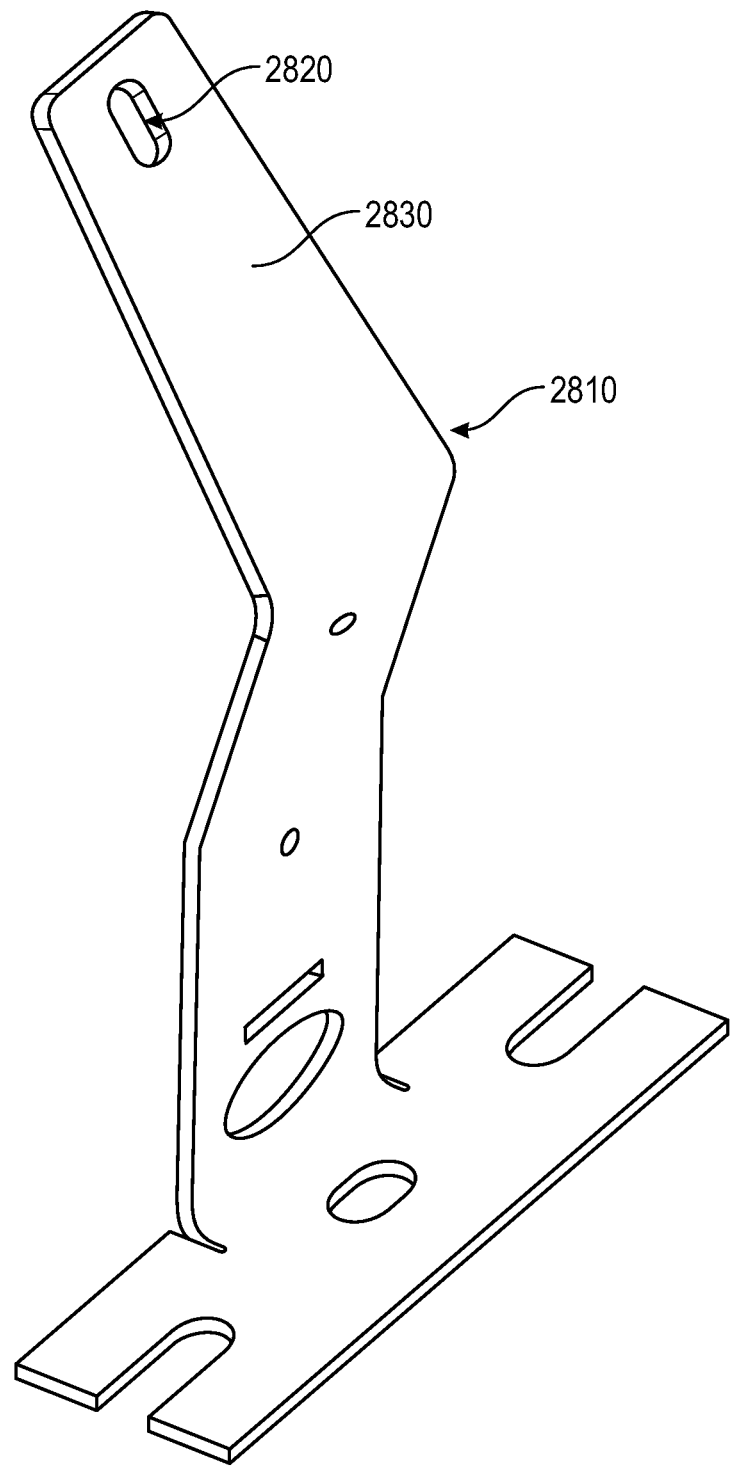
FIG. 28 is a perspective view of an end riser of the frame assembly of FIG. 17, having an enclosed slot sized and arranged to receive and capture (rotationally and laterally) the distally extended keyway of the end shaft of FIG. 27, according to an alternate embodiment.

Reference is made to FIGS. 27 and 28, which show respectively an end shaft 2710 and end riser according to an alternate embodiment. In this example (which can be varied for differing types of end shaft and shaft), the end shaft 2710 includes a similar stop 1239 and seat 1240 to that described above (see FIG. 12). A similar surface finish 1410 (e.g. knurled) is also provided by way of non-limiting example. Keyway flats 272 are cut into the distal end of the end shaft 2710, and extend fully to the distal end with a similar cross section along their length. These flats allow the end shaft 2710 to be inserted into, and secured within a corresponding slot 2820 in the end riser 2810 at the upper end of the section 2830. The slot 2820 conforms to the outer perimeter of the keyed portion (adjacent to flats 2720) of the end shaft 2710. It fully surrounds/encompasses the shaft keyway section, free of any upward play, which is possible in the above-described end risers 124, 126. The central risers of a support, in such an arrangement, typically have open slots (see slots 1932) as described above or enclosed slots similar to the end riser slot 2820. Other components of the end riser 2810 are formed similarly to those described above (i.e. for end risers 124 and 126), and not further described herein. This type of slot 2820 only allows receipt of keyed end shafts that have flats extending entirely to the distal end. To attach a roller assembly, the end shaft is first inserted into slot 2820 and then the opposing end shaft is inserted into the open slot in the opposing central riser. As described above, this embodiment of the end shaft 2710 omits a separate, stepped diameter to receive the seal, and defines only a large (e.g. knurled/serrated) diameter 1240 to receive the bearing. The seal is seated on the smallest-diameter, outermost section 2730, which also defines the distal keyway. In further alternate embodiments, this version of the end shaft can include a separate seal diameter. In further alternate embodiments the keyway flat can be provided on only one side of the end shaft with the riser receiving slot conforming to this shape. Other non-circular-cross-section shapes (e.g. polygons, ovals, etc.) can also be defined by the cross section of the distally extended keyway of the end shaft, with a conforming receiving slot in the riser. Note also that the size of the shaft keyway and the corresponding fully surrounding/enclosed slot are highly variable, based in part upon the size of the idler and/or diameter of the end shaft.

VI. Conclusion

It should be clear that the above-described assemblies provide a longer life, better performing, more versatile, lighter weight and easier-to manufacture idler, shaft assembly and supporting framework than those contemplated in the prior art. More particularly, the use of at least three discrete seals and a geometry that directs debris and contamination outwardly under centrifugal force, significantly reduces the risk of bearing contamination and failure. Additionally, the illustrative multi-piece shaft designs herein are generally lighter weight than an equivalent solid shaft due to their hollow structure, and can be produced for lower overall cost due to reduced material requirements. Moreover, the illustrative multi-piece shaft allows the design to be engineered for a specific application loading and/or scalability by changing the section properties of the center shaft (solid vs. hollow, wall thickness of hollow shaft, etc.). Advantageously, the above-described multi-piece shaft allows the transitioning a load from one end shaft/bearing to the other while remaining more compliant than a solid shaft, thereby reducing the negative affect of misalignment in the bearings caused by manufacturing tolerances of the mating external components used to locate the outer race of the bearings. Also, the multi-piece shaft allows for the use of powdered (sintered) metal construction on the end shaft(s) thereby reducing overall cost. Uniquely, when used with a hollow shaft this design allows placement of one or more sensor(s) within the interior of the center shaft for constant monitoring or idler identification. Also, the illustrative embodiments provide a supporting framework for a trough-type idler arrangement that can be constructed in an accurate, inexpensive and straightforward manner using sheet metal forming and cutting techniques and minimal welding. The design and manufacture of the supporting framework also allows debris and contaminates a means of egress (e.g. center slot 1920, port holes 2230) which reduces required maintenance, and can increase the service life of the idler by preventing buildup of material between the idler and the framework.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Also, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of mechanical, electromechanical, electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using mechanical, electromechanical and/or electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A framework for a plurality of idlers, mounted on central and end risers, that rotatably support a conveyor belt comprising:
   a center section formed from stamped sheet metal, defining a non-planar cross section with opposing ends comprising tabs for receiving a pair of end risers;
   wherein the central risers are folded up from a top surface of the center section as unitary members; and
   wherein the pair of end risers are mounted at each of the opposing ends, are formed from sheet metal and affixed to the ends by a metal attachment process, and each comprise at least one slot for receiving one of the tabs.

2. The framework as set forth in claim 1 wherein the end risers comprise a base section and a riser section with a fold line therebetween.

3. The framework as set forth in claim 2 wherein the central risers define folded ends adapted to receive end shafts of idler on each of opposing sides thereof.

4. The framework as set forth in claim 3 wherein the central risers and the end risers define folds that orient a center idler along a horizontal rotation axis and each of a pair of idlers on opposing sides of the center idler at opposing upward-acute-angled rotation axes with respect to the horizontal rotation axis so as to define a trough shape.

5. The framework as set forth in claim 2, wherein the riser section defines a first fold in a first direction and a second fold in a second direction.

6. The framework as set forth in claim 1, wherein the central risers have a length greater than a width, and wherein the central risers are folded up from the center section at a base of the width.

7. The framework as set forth in claim 6, wherein the central risers each define an elongated central slot that extend along a length of each central riser, the elongated central slots having narrowed portions of the slot at each end of the slot.

8. The framework as set forth in claim 7, wherein the central risers are folded along the width of the central riser at the central slots.

9. The framework as set forth in claim 8, wherein a wider portion of the central slot is sized and adapted to allow the end of a roller shaft to pass into the slot, and the narrowed portion of the central slot sized and adapted to hold and restrain the end of the roller shaft.

10. The framework as set forth in claim 7, wherein the sides of the center section extending between the opposing ends have a first downward fold extending between the opposing ends so that the sides of the center section fold downwards along their length, and a second fold extending between the opposing ends, the second fold in an opposite direction from the first fold.

11. A method of manufacture of a framework for a plurality of idlers mounted on central and end risers that rotatably support a conveyor belt, wherein the framework comprises a center section formed from stamped sheet metal, defining a non-planar cross section with opposing ends, and wherein the central risers are folded up from a top surface of the center section as unitary members, and wherein the framework further comprises a pair of end risers mounted at each of the opposing ends, formed from sheet metal and affixed to the ends by a metal attachment process, wherein the method comprises the steps of:
   forming a center section sheet metal blank that includes cutouts for the central risers and edges with tabs for receiving the end risers;
   stamping the center section sheet metal blank into a non-planar shape with the top surface and sides;
   folding up the central risers;
   defining offsets and folds in the central risers to receive end shafts;
   forming an end riser sheet metal blank for each of a pair of end risers, including at least one slot for receiving one of the tabs;
   folding each end riser sheet metal blank to define a base section and a riser section in a transverse orientation relative to each other;
   folding each central riser section to respectively define an acute angle; and
   applying and affixing each end riser to each of the opposing ends of the center section.

12. The method as set forth in claim 11, further comprising attaching keyway slots in the end shafts of each of the idlers to a respective slot formed in an end of each of the end risers and cutouts formed in the central risers.

13. The method as set forth in claim 11, wherein folding each end riser sheet metal blank further comprises folding the riser section along an intermediate fold line in a first direction forming an obtuse angle, and folding the riser section along an upper fold line in a second direction opposite to the first direction forming an obtuse angle.

14. The method as set forth in claim 11, wherein forming a center section sheet metal blank that includes cutouts for the central risers further comprises forming cutouts that extend along a length of each central riser, the elongated central slots having narrowed portions of each slot at each end of the slot.

15. The method as set forth in claim 14, wherein defining folds in the central risers further comprises defining folds along the width of the central risers at the central slots.

16. The method as set forth in claim 15, further comprising attaching the end shafts of each of the idlers to a respective slot formed in an end of each of the end risers and in the cutouts formed in the central risers, wherein the end shafts are inserted into a wider portion of each cutout, and the keyway slot is slid into the narrow portion of each cutout to attach the end shaft to the central riser.

\* \* \* \* \*